(12) United States Patent
Liang et al.

(10) Patent No.: US 9,420,276 B2
(45) Date of Patent: Aug. 16, 2016

(54) CALIBRATION OF LIGHT-FIELD CAMERA GEOMETRY VIA ROBUST FITTING

(71) Applicant: Lytro, Inc., Mountain View, CA (US)

(72) Inventors: Chia-Kai Liang, San Jose, CA (US); Zejing Wang, Mountain View, CA (US)

(73) Assignee: Lytro, Inc., Mountain View, CA (US)

( * ) Notice: Subject to any disclaimer, the term of this patent is extended or adjusted under 35 U.S.C. 154(b) by 0 days.

(21) Appl. No.: 14/854,493

(22) Filed: Sep. 15, 2015

(65) Prior Publication Data

US 2016/0029017 A1 Jan. 28, 2016

Related U.S. Application Data

(63) Continuation-in-part of application No. 14/456,132, filed on Aug. 11, 2014, now Pat. No. 9,172,853, which is a continuation of application No. 13/774,971, filed on Feb. 22, 2013, now Pat. No. 8,831,377, and a (Continued)

(51) Int. Cl.
*G06K 7/00* (2006.01)
*H04N 17/00* (2006.01)
(Continued)

(52) U.S. Cl.
CPC ............ *H04N 17/002* (2013.01); *G02B 3/0056* (2013.01); *G02B 27/0075* (2013.01); *G06T 7/0018* (2013.01); *H04N 5/2254* (2013.01)

(58) Field of Classification Search
CPC . H04N 17/002; H04N 5/23293; H04N 5/217; H04N 5/211; H04N 5/2254; G06T 7/0018; G02B 27/0018; G02B 3/0056
See application file for complete search history.

(56) References Cited

U.S. PATENT DOCUMENTS 725,567 A 4/1903 Ives
4,383,170 A 5/1983 Takagi et al.
(Continued)

FOREIGN PATENT DOCUMENTS

DE 19624421 6/1996
WO 03052465 6/2003
(Continued)

OTHER PUBLICATIONS

Belhumeur, Peter et al., "The Bas-Relief Ambiguity", International Journal of Computer Vision, 1999, pp. pp. 33-44, revised version.
(Continued)

*Primary Examiner* — Amir Alavi
(74) *Attorney, Agent, or Firm* — Raubvogel Law Office

(57) ABSTRACT

Microlens positions for a light-field capture device may be calibrated. A calibration light-field image may be captured, with a microlens portion corresponding to each microlens of the light-field capture device. Interstitial spaces between the microlens portions may be identified and used to locate one or more center locations of the microlens portions. The center locations may be used to generate a model that indicates the microlens positions. Additionally or alternatively, the calibration light field image may be used to select one or more contour samples from among multiple contour samples of the microlens portions. The contour sample may be fitted to a circle centered at a center location of a microlens portion to identify the center location, which may then be used to generate a model that indicates the microlens positions. Multiple iterations may be used to enhance the accuracy of the models.

34 Claims, 26 Drawing Sheets

Related U.S. Application Data continuation-in-part of application No. 13/688,026, filed on Nov. 28, 2012, now Pat. No. 8,811,769.

(60) Provisional application No. 61/604,155, filed on Feb. 28, 2012, provisional application No. 61/604,175, filed on Feb. 28, 2012, provisional application No. 61/604,195, filed on Feb. 28, 2012, provisional application No. 61/655,790, filed on Jun. 5, 2012.

(51) Int. Cl.
 G06T 7/00 (2006.01)
 G02B 3/00 (2006.01)
 H04N 5/225 (2006.01)
 G02B 27/00 (2006.01)

(56) References Cited

U.S. PATENT DOCUMENTS

| | | |
|---|---|---|
| 4,661,986 A | 4/1987 | Adelson |
| 4,694,185 A | 9/1987 | Weiss |
| 4,920,419 A | 4/1990 | Easterly |
| 5,076,687 A | 12/1991 | Adelson |
| 5,282,045 A | 1/1994 | Mimura et al. |
| 5,610,390 A | 3/1997 | Miyano |
| 5,748,371 A | 5/1998 | Cathey, Jr. et al. |
| 5,757,423 A | 5/1998 | Tanaka et al. |
| 5,835,267 A | 11/1998 | Mason et al. |
| 5,949,433 A | 9/1999 | Klotz |
| 6,023,523 A | 2/2000 | Cohen et al. |
| 6,028,606 A | 2/2000 | Kolb et al. |
| 6,097,394 A | 8/2000 | Levoy et al. |
| 6,201,899 B1 | 3/2001 | Bergen |
| 6,320,979 B1 | 11/2001 | Melen |
| 6,483,535 B1 | 11/2002 | Tamburrino et al. |
| 6,529,265 B1 | 3/2003 | Henningsen |
| 6,577,342 B1 | 6/2003 | Wester |
| 6,597,859 B1 | 7/2003 | Leinhart et al. |
| 6,842,297 B2 | 1/2005 | Dowski, Jr. |
| 6,900,841 B1 | 5/2005 | Mihara |
| 6,927,922 B2 | 8/2005 | George et al. |
| 7,034,866 B1 | 4/2006 | Colmenarez et al. |
| 7,206,022 B2 | 4/2007 | Miller et al. |
| 7,329,856 B2 | 2/2008 | Ma et al. |
| 7,336,430 B2 | 2/2008 | George |
| 7,620,309 B2 | 11/2009 | Georgiev |
| 7,623,726 B1 | 11/2009 | Georgiev |
| 7,723,662 B2 * | 5/2010 | Levoy .......... G02B 21/361 250/208.1 |
| 7,936,392 B2 | 5/2011 | Ng et al. |
| 7,945,653 B2 | 5/2011 | Zuckerberg et al. |
| 7,949,252 B1 | 5/2011 | Georgiev |
| 8,155,478 B2 | 4/2012 | Vitsnudel et al. |
| 8,279,325 B2 * | 10/2012 | Pitts .......... H04N 5/23212 348/345 |
| 8,289,440 B2 * | 10/2012 | Knight .......... H04N 5/2252 348/222.1 |
| 8,290,358 B1 | 10/2012 | Georgiev |
| 8,427,548 B2 | 4/2013 | Lim et al. |
| 8,446,516 B2 * | 5/2013 | Pitts .......... H04N 5/23212 348/345 |
| 8,559,705 B2 * | 10/2013 | Ng .......... G06T 5/001 345/157 |
| 8,577,216 B2 | 11/2013 | Li et al. |
| 8,581,998 B2 | 11/2013 | Ohno |
| 8,724,014 B2 * | 5/2014 | Ng .......... H04N 5/2252 348/222.1 |
| 8,831,377 B2 * | 9/2014 | Pitts .......... H04N 5/2254 382/275 |
| 9,172,853 B2 * | 10/2015 | Pitts .......... H04N 5/2254 |
| 2002/0159030 A1 | 10/2002 | Frey et al. |
| 2003/0103670 A1 | 6/2003 | Schoelkopf et al. |
| 2003/0117511 A1 | 6/2003 | Belz et al. |
| 2003/0156077 A1 | 8/2003 | Balogh |
| 2004/0114176 A1 | 6/2004 | Bodin et al. |
| 2004/0257360 A1 | 12/2004 | Sieckmann |
| 2005/0080602 A1 | 4/2005 | Snyder et al. |
| 2006/0130017 A1 | 6/2006 | Cohen et al. |
| 2007/0071316 A1 | 3/2007 | Kubo |
| 2007/0230944 A1 | 10/2007 | Georgiev |
| 2007/0252074 A1 | 11/2007 | Ng et al. |
| 2008/0007626 A1 | 1/2008 | Wernersson |
| 2008/0131019 A1 | 6/2008 | Ng |
| 2008/0152215 A1 | 6/2008 | Horie et al. |
| 2008/0180792 A1 | 7/2008 | Georgiev |
| 2008/0187305 A1 | 8/2008 | Raskar et al. |
| 2008/0193026 A1 | 8/2008 | Horie et al. |
| 2008/0226274 A1 | 9/2008 | Spielberg |
| 2008/0266655 A1 | 10/2008 | Levoy et al. |
| 2008/0277566 A1 | 11/2008 | Utagawa |
| 2008/0309813 A1 | 12/2008 | Watanabe |
| 2009/0027542 A1 | 1/2009 | Yamamoto et al. |
| 2009/0041381 A1 | 2/2009 | Georgiev et al. |
| 2009/0041448 A1 | 2/2009 | Georgiev et al. |
| 2009/0102956 A1 | 4/2009 | Georgiev |
| 2009/0128658 A1 | 5/2009 | Hayasaka et al. |
| 2009/0128669 A1 | 5/2009 | Ng et al. |
| 2009/0140131 A1 | 6/2009 | Utagawa |
| 2009/0185801 A1 | 7/2009 | Georgiev et al. |
| 2009/0190022 A1 | 7/2009 | Ichimura |
| 2009/0190024 A1 | 7/2009 | Hayasaka et al. |
| 2009/0268970 A1 | 10/2009 | Babacan et al. |
| 2009/0273843 A1 | 11/2009 | Raskar et al. |
| 2009/0295829 A1 | 12/2009 | Georgiev et al. |
| 2010/0026852 A1 | 2/2010 | Ng et al. |
| 2010/0128145 A1 | 5/2010 | Pitts et al. |
| 2010/0129048 A1 | 5/2010 | Pitts et al. |
| 2010/0141802 A1 | 6/2010 | Knight et al. |
| 2010/0277629 A1 | 11/2010 | Tanaka |
| 2011/0129165 A1 | 6/2011 | Lim et al. |
| 2011/0234841 A1 | 9/2011 | Akeley et al. |
| 2012/0050562 A1 | 3/2012 | Perwass et al. |
| 2012/0249550 A1 | 10/2012 | Akeley et al. |
| 2012/0327222 A1 | 12/2012 | Ng et al. |
| 2013/0033636 A1 | 2/2013 | Pitts et al. |
| 2013/0113981 A1 | 5/2013 | Knight et al. |
| 2013/0128081 A1 | 5/2013 | Georgiev et al. |
| 2014/0184885 A1 | 7/2014 | Tanaka et al. |
| 2014/0340390 A1 | 11/2014 | Lanman et al. |
| 2016/0029017 A1 * | 1/2016 | Liang .......... G02B 27/0075 348/175 |

FOREIGN PATENT DOCUMENTS

| | | |
|---|---|---|
| WO | 2006039486 | 4/2006 |
| WO | 2006129677 | 12/2006 |
| WO | 2007092545 | 8/2007 |
| WO | 2007092581 | 8/2007 |

OTHER PUBLICATIONS

Chai, Jin-Xang et al., "Plenoptic Sampling", ACM SIGGRAPH 2000, Annual Conference Series, 2000, pp. 307-318.

Chen, W., et al., "Light field mapping: Efficient representation and hardware rendering of surface light fields". ACM Transactions on Graphics 21, 3, 447-456, 2002.

Georgiev, T., et al., Plenoptic Camera 2.0 (2008).

Georgiev, T., et al., "Unified Frequency Domain Analysis of Lightfield Cameras" (2008).

Georgiev, T., et al., "Spatio-Angular Resolution Tradeoff in Integral Photography," Proceedings of Eurographics Symposium on Rendering, 2006.

Gortler et al., "The lumigraph" SIGGRAPH 96, pp. 43-54.

Haeberli, "A Multifocus Method for Controlling Depth of Field" Graphica Obscura, 1994, pp. 1-3.

Isaksen, A., et al., "Dynamically Reparameterized Light Fields," SIGGRAPH 2000, pp. 297-306.

Ives, Herbert, "Parallax Panoramagrams Made with a Large Diameter Lens", 1930.

Ives, H., "Optical properties of a Lippman lenticulated sheet," J. Opt. Soc. Am. 21, 171 (1931).

(56) References Cited

OTHER PUBLICATIONS

Jackson et al., "Selection of a Convolution Function for Fourier Inversion Using Gridding" IEEE Transactions on Medical Imaging, Sep. 1991, vol. 10, No. 3, pp. 473-478.
Kautz, J., et al., "Fast arbitrary BRDF shading for low-frequency lighting using spherical harmonics", in Eurographics Rendering Workshop 2002, 291-296.
Lehtinen, J., et al., "Matrix radiance transfer", in Symposium on Interactive 3D graphics, 59-64, 2003.
Levoy, M., et al., "Light Field Microscopy," ACM Transactions on Graphics, vol. 25, No. 3, Proceedings SIGGRAPH 2006.
Levoy et al.,"Light Field Rendering" SIGGRAPH 96 Proceeding, 1996. pp. 31-42.
Levoy, "Light Fields and Computational Imaging" IEEE Computer Society, Aug. 2006, pp. 46-55.
Levoy, Marc, "Autofocus: Phase Detection", http://graphics.stanford.edu/courses/cs178/applets/autofocusPD.html, pp. 1-3, 2010.
Liang, Chia-Kai, et al., "Programmable Aperture Photography: Multiplexed Light Field Acquisition", ACM SIGGRAPH 2008.
Wilburn, Bennett, et al., "The Light Field Video Camera", Proceedings of Media Processors 2002.
Williams, L., "Pyramidal Parametrics", Computer Graphics (1983).
Winnemöller, H., et al., "Light Waving: Estimating Light Positions From Photographs Alone", Eurographics 2005.

\* cited by examiner

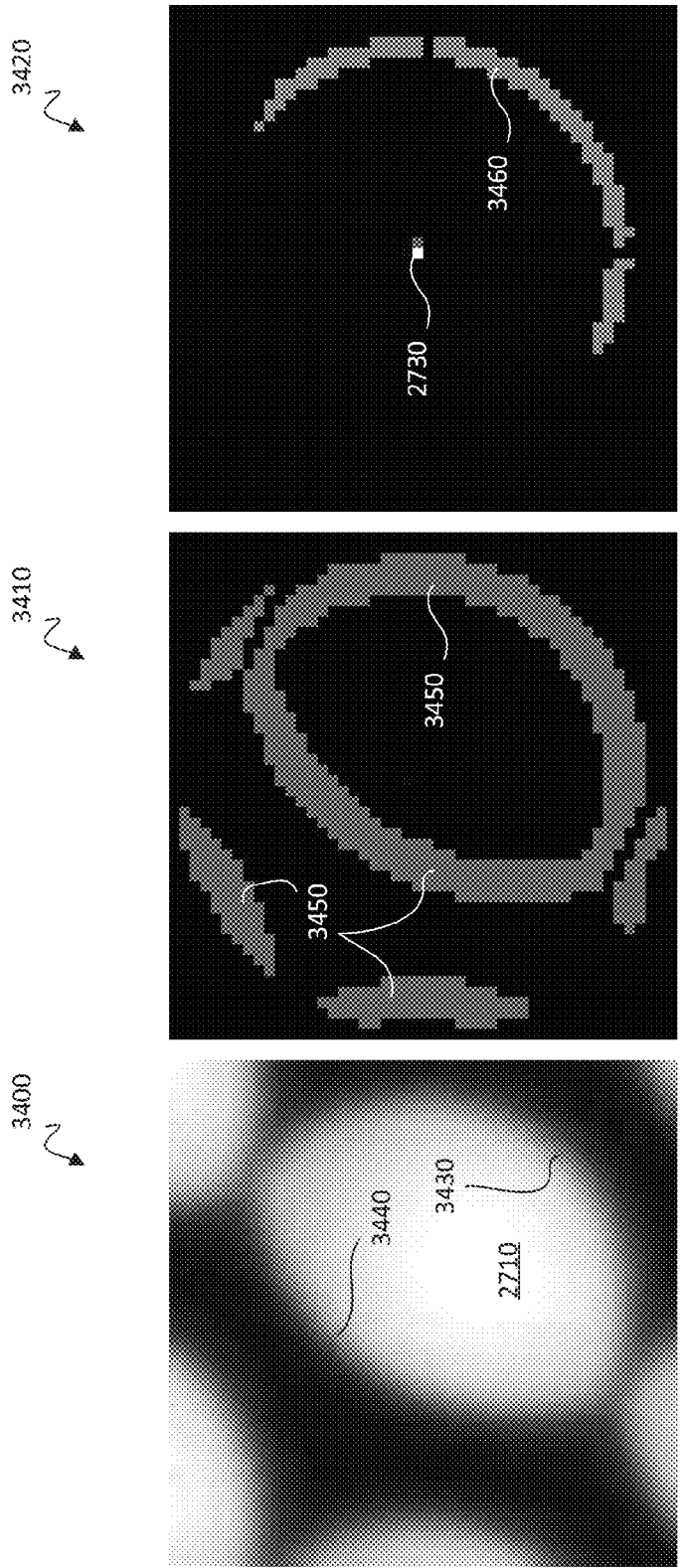

CALIBRATION OF LIGHT-FIELD CAMERA GEOMETRY VIA ROBUST FITTING

CROSS-REFERENCE TO RELATED APPLICATIONS

The present application claims priority as a continuation-in-part of U.S. Utility application Ser. No. 14/456,132 for "Microlens Array Architecture for Avoiding Ghosting in Projected Images", filed on Aug. 11, 2014, now U.S. Pat. No. 9,172,853 the disclosure of which is incorporated herein by reference in its entirety.

U.S. Utility application Ser. No. 14/456,132 claims priority as a continuation of U.S. Utility application Ser. No. 13/774,971 for "Compensating for Variation in Microlens Position During Light-Field Image Processing", filed on Feb. 22, 2013 and issued on Sep. 9, 2014 as U.S. Pat. No. 8,831,377, the disclosure of which is incorporated herein by reference in its entirety.

U.S. Utility application Ser. No. 13/774,971 claims priority from U.S. Provisional Application Ser. No. 61/604,155 for "Compensating for Sensor Saturation and Microlens Modulation During Light-Field Image Processing", filed on Feb. 28, 2012, the disclosure of which is incorporated herein by reference in its entirety.

U.S. Utility application Ser. No. 13/774,971 further claims priority from U.S. Provisional Application Ser. No. 61/604,175 for "Compensating for Variation in Microlens Position During Light-Field Image Processing", filed on Feb. 28, 2012, the disclosure of which is incorporated herein by reference in its entirety.

U.S. Utility application Ser. No. 13/774,971 further claims priority from U.S. Provisional Application Ser. No. 61/604,195 for "Light-Field Processing and Analysis, Camera Control, and User Interfaces and Interaction on Light-Field Capture Devices", filed on Feb. 28, 2012, the disclosure of which is incorporated herein by reference in its entirety.

U.S. Utility application Ser. No. 13/774,971 further claims priority from U.S. Provisional Application Ser. No. 61/655,790 for "Extending Light-Field Processing to Include Extended Depth of Field and Variable Center of Perspective", filed on Jun. 5, 2012, the disclosure of which is incorporated herein by reference in its entirety.

U.S. Utility application Ser. No. 13/774,971 further claims priority as a continuation-in-part of U.S. Utility application Ser. No. 13/688,026 for "Extended Depth of Field and Variable Center of Perspective In Light-Field Processing", filed on Nov. 28, 2012 and issued on Aug. 19, 2014 as U.S. Pat. No. 8,811,769, the disclosure of which is incorporated herein by reference in its entirety.

The present application is related to U.S. Utility application Ser. No. 11/948,901 for "Interactive Refocusing of Electronic Images,", filed Nov. 30, 2007 and issued on Oct. 15, 2013 as U.S. Pat. No. 8,559,705, the disclosure of which is incorporated herein by reference in its entirety.

The present application is related to U.S. Utility application Ser. No. 12/703,367 for "Light-field Camera Image, File and Configuration Data, and Method of Using, Storing and Communicating Same,", filed Feb. 10, 2010, the disclosure of which is incorporated herein by reference in its entirety.

The present application is related to U.S. Utility application Ser. No. 13/603,275 for "Light Field Data Acquisition,", filed Sep. 4, 2012 and issued on May 13, 2014 as U.S. Pat. No. 8,724,014, the disclosure of which is incorporated herein by reference in its entirety.

The present application is related to U.S. Utility application Ser. No. 13/027,946 for "3D Light-field Cameras, Images and Files, and Methods of Using, Operating, Processing and Viewing Same", filed on Feb. 15, 2011 and issued on Jun. 10, 2014 as U.S. Pat. No. 8,749,620, the disclosure of which is incorporated herein by reference in its entirety.

The present application is related to U.S. Utility application Ser. No. 13/155,882 for "Storage and Transmission of Pictures Including Multiple Frames,", filed Jun. 8, 2011 and issued on Dec. 9, 2014 as U.S. Pat. No. 8,908,058, the disclosure of which is incorporated herein by reference in its entirety.

The present application is related to U.S. Utility application Ser. No. 13/774,925 for "Compensating for Sensor Saturation and Microlens Modulation During Light-Field Image Processing,", filed on Feb. 22, 2013 and issued on Feb. 3, 2015 as U.S. Pat. No. 8,948,545, the disclosure of which is incorporated herein by reference in its entirety.

The present application is related to U.S. Utility application Ser. No. 13/774,986 for "Light-Field Processing and Analysis, Camera Control, and User Interfaces and Interaction on Light-Field Capture Devices,", filed on Feb. 22, 2013 and issued on Mar. 31, 2015 as U.S. Pat. No. 8,995,785, the disclosure of which is incorporated herein by reference in its entirety.

TECHNICAL FIELD

The present disclosure relates to systems and methods for processing and displaying light-field image data.

BACKGROUND

In conventional photography, the camera must typically be focused at the time the photograph is taken. The resulting image may have only color data for each pixel; accordingly, any object that was not in focus when the photograph was taken cannot be brought into sharper focus because the necessary data does not reside in the image.

By contrast, light-field images typically encode additional data for each pixel related to the trajectory of light rays incident to that pixel when the light-field image was taken. This data can be used to manipulate the light-field image through the use of a wide variety of rendering techniques that are not possible to perform with a conventional photograph. In some implementations, a light-field image may be refocused and/or altered to simulate a change in the center of perspective (CoP) of the camera that received the image. Further, a light-field image may be used to generate an enhanced depth-of-field (EDOF) image in which all parts of the image are in focus. In some light-field cameras, light-field data are captured through the use of a microlens array adjacent to the image sensor. Each ray of light passes through the microlens array, and is redirected by one of the microlenses to a location on the image sensor that indicates the origin of the ray.

Unfortunately, due to the limitations of manufacturing processes, the exact position and orientation of the microlens array, relative to the image sensor, may vary from one camera to the next. Thus, in order to obtain accurate information from the light-field data regarding the origin of light received by the image sensor, the camera must be properly calibrated based on the actual position and orientation of the microlens array relative to the image sensor.

Certain effects can pose unique challenges for such calibration. For example, if the lens of the light-field image capture device has a strong shading and/or vignetting effect, the calibration image may have significant intensity gradients that make it difficult to properly locate the center of the microlens array. Further, if the aperture of the light-field image capture device causes significant eclipse effects to occur, the center of any given microlens may be difficult to properly locate, due to fact that such eclipse effects may cause microlens portions of a light-field image to have a non-circular shape. Existing calibration techniques do not provide satisfactory solutions to these challenges.

SUMMARY

According to various embodiments, the system and method described herein provide calibration systems and methods that are more robust, particularly when shading, vignetting, and/or eclipse effects are present in the light-field camera. Enhanced calibration models may be obtained for a given light-field camera that help to provide accurate calibration, even when such effects are present.

According to one embodiment, a calibration light-field image may be captured, with a microlens portion corresponding to each microlens of the light-field capture device. Interstitial spaces between the microlens portions may be identified and used to locate one or more center locations of the microlens portions.

The interstitial spaces may be identified through the use of an inverted, eroded calibration light-field image generated via modification of the calibration light-field image. The center locations may be used to generate a model that indicates the microlens positions. The model may be iteratively refined by locating additional microlens centers (for example, with increasing distance from the center of the image sensor) and modifying the model based on the locations of these microlens centers.

Additionally or alternatively, the calibration light field image may be used to select one or more contour samples from among multiple contour samples of the microlens portion. The contour samples for the microlens portion may be identified from within a resampled calibration light-field image with greater angular resolution, and less spatial resolution, than the original calibration light-field image. An optimization algorithm such as a RANSAC algorithm may be applied to determine which of the identified contour samples represent edges of the microlens portion, and should thus be selected for arc fitting. In at least one embodiment, the method is applied to each microlens individually, independent of other microlenses.

The selected contour samples may be fitted to a circle or arc centered at a center location of a microlens portion to identify the center location, which may then be used to generate a model that indicates the microlens positions. Multiple iterations may be used to enhance the accuracy of the models.

The interstitial space identification and arc fitting methods of locating the center of a microlens portion maybe used independently of each other. Additionally, they may be used in combination with each other and/or other calibration methods.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

FIGS. 24A, 24B, and 24C illustrate images that are the crops of a portion of the 4D table of FIG. 23, before contour sample selection, after identification of a plurality of contour samples, and after selection contour samples of the plurality of contour samples for arc fitting, respectively, according to one embodiment.

DEFINITIONS

Figure 1:
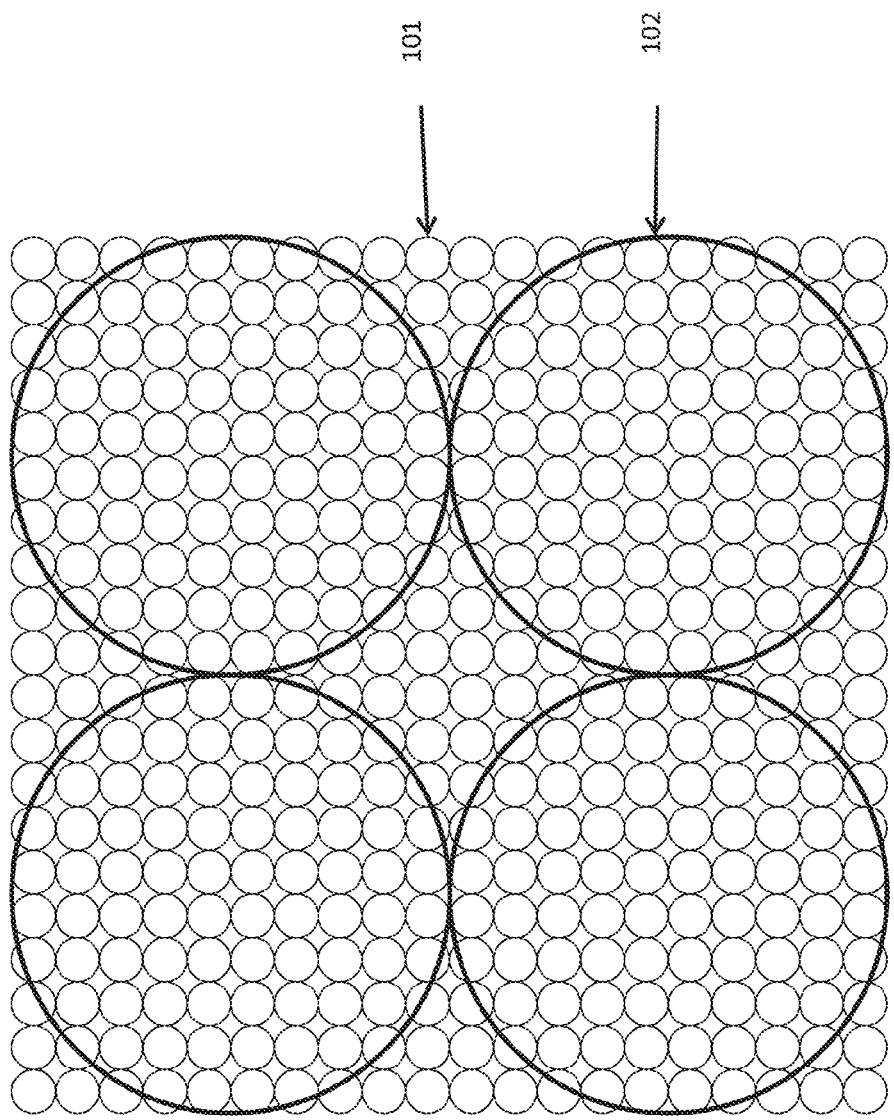
FIG. 1 depicts a portion of a light-field image.

For purposes of the description provided herein, the following definitions are used:

aggregated irradiance: total irradiance over a period of time, e.g., on a sensor pixel while the shutter is open.

anterior nodal point: the nodal point on the scene side of a lens.

Bayer pattern: a particular 2×2 pattern of different color filters above pixels on a digital sensor. The filter pattern is 50% green, 25% red and 25% blue.

calibration light-field image: a light-field image captured for the purpose of calibrating a light-field image capture device.

clamp: in the context of the present disclosure, to "clamp a signal to a value" means to select the smaller of the signal value and the clamp value.

contour sample: one or more pixels of a light-field image such as a calibration light-field image or a resampled calibration light-field image that may indicate the contour or edge of a microlens portion.

data store: any device capable of volatile or nonvolatile digital data storage.

disk: a region in a light-field image that is illuminated by light passing through a single microlens; may be circular or any other suitable shape.

entrance pupil: the image of the aperture of a lens, viewed from the side of the lens that faces the scene.

exit pupil: the image of the aperture of a lens, viewed from the side of the lens that faces the image.

flat-field image: a light-field image of a scene with undifferentiated rays.

flat-field response contour: a continuous plot of the value that a hypothetical sensor pixel would take if centered at various locations on the surface of a sensor.

image: a two-dimensional array of pixel values, or pixels, each specifying a color.

interstitial space: the space between adjacent microlens portions of a light-field image such as a calibration light-field image.

lambda: a measure of distance perpendicular to the primary surface of the microlens array. One lambda corresponds to the perpendicular distance along which the diameter of the cone of light from a point in the scene changes by a value equal to the pitch of the microlens array.

light-field image: an image that contains a representation of light-field data captured at the sensor.

microlens: a small lens, typically one in an array of similar microlenses.

microlens portion: the portion of a light-field image that pertains to and encodes data from light received through a single microlens of a microlens array.

MLA: abbreviation for microlens array.

model: mathematical approximation of a system or process, such as light-field capture by a light-field image capture device.

modulation image: an image that is computed from a flat-field image by normalizing based on average values (per color channel).

nodal point: the center of a radially symmetric thin lens. For a lens that cannot be treated as thin, one of two points that together act as thin-lens centers, in that any ray that enters one point exits the other along a parallel path.

normalized pixel value: a sensor pixel value that has been adjusted to a range where 0.0 corresponds to black (no light) and 1.0 corresponds to saturation.

processor: any device that processes or otherwise manipulates digital data.

representative ray: a single ray that represents all the rays that reach a pixel.

vignetting: a phenomenon, related to modulation, in which an image's brightness or saturation is reduced at the periphery as compared to the image center.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present disclosure, and that the disclosure is not limited to cameras. Thus, the use of the term "camera" herein is intended to be illustrative and exemplary, but should not be considered to limit the scope of the disclosure. Specifically, any use of such term herein should be considered to refer to any suitable device for acquiring image data.

In the following description, several techniques and methods for processing light-field images are described. One skilled in the art will recognize that these various techniques and methods can be performed singly and/or in any suitable combination with one another.

Architecture

Figure 6A:
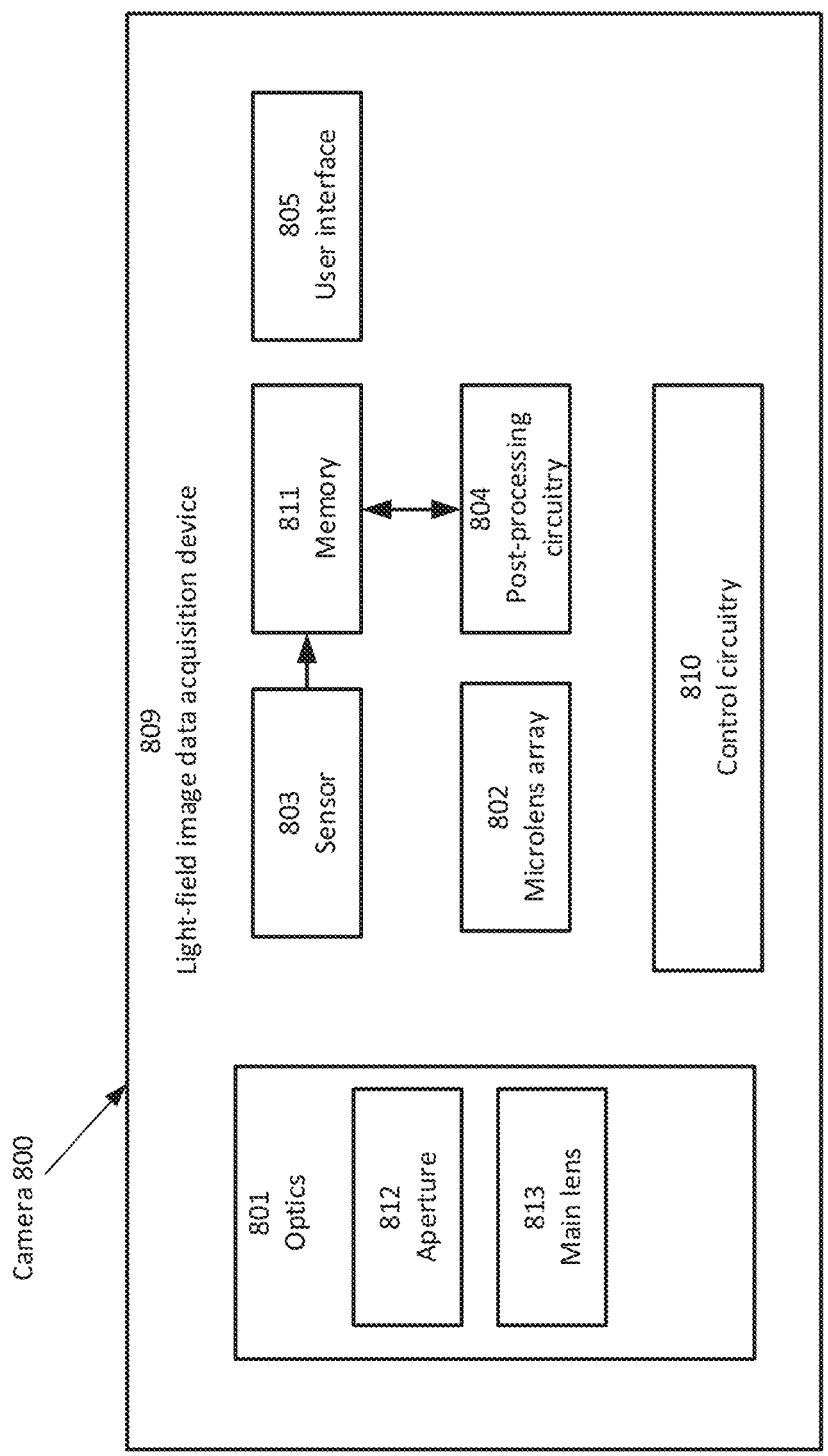
FIG. 6A depicts an example of an architecture for implementing the present disclosure in a light-field capture device, according to one embodiment.
Figure 6B:
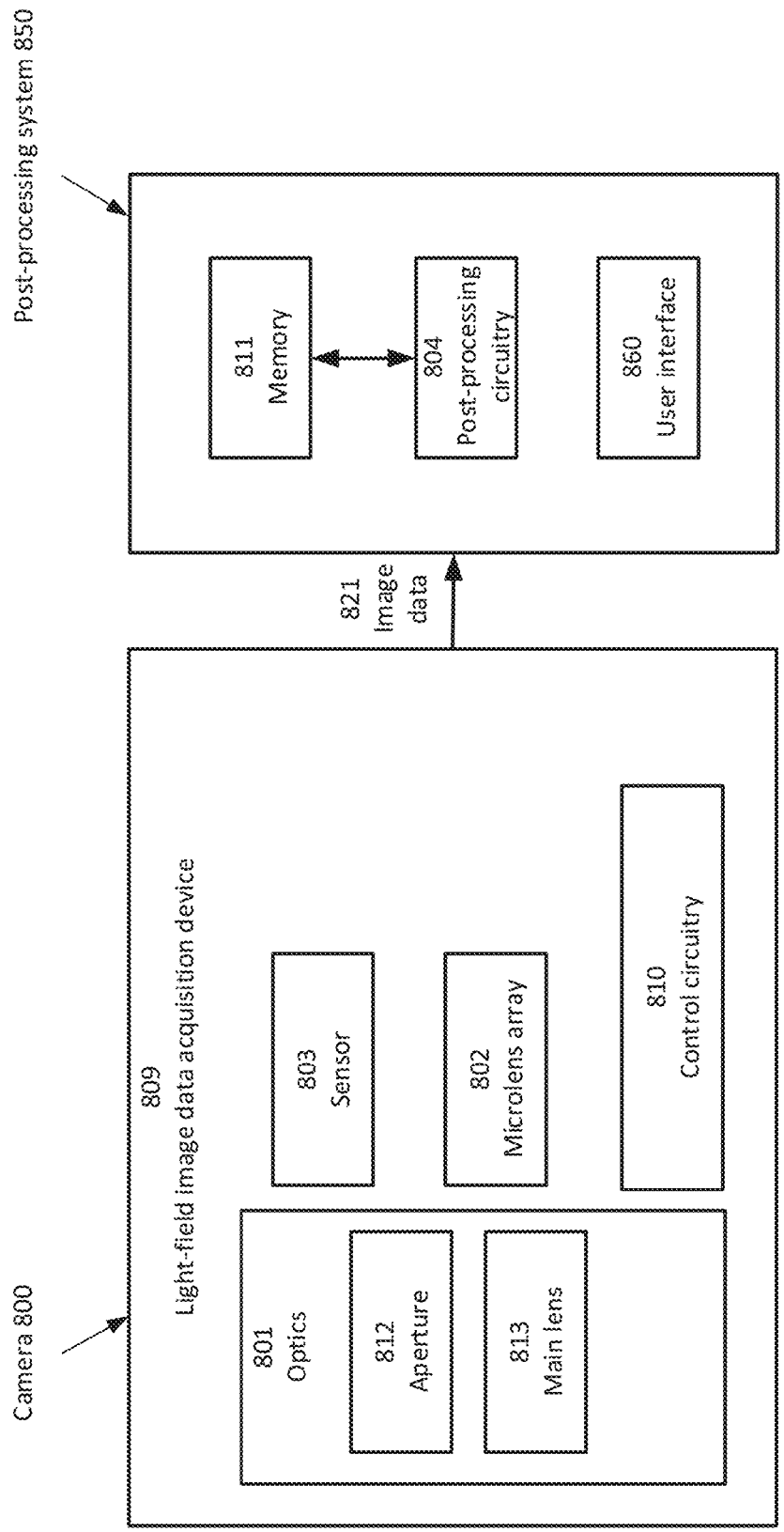
FIG. 6B depicts an example of an architecture for implementing the present disclosure in a post-processing system communicatively coupled to a light-field capture device, according to one embodiment.

In at least one embodiment, the system and method described herein can be implemented in connection with light-field images captured by light-field capture devices including but not limited to those described in Ng et al., Light-field photography with a hand-held plenoptic capture device, Technical Report CSTR 2005-02, Stanford Computer Science. Referring now to FIG. 6A, there is shown a block diagram depicting an architecture for implementing the present disclosure in a light-field capture device such as a camera 800. Referring now also to FIG. 6B, there is shown a block diagram depicting an architecture for implementing the present disclosure in a post-processing system 850 communicatively coupled to a light-field capture device such as a camera 800, according to one embodiment. The post-processing system 850 may have memory 811, post-processing circuitry 804, and/or a user interface 860, which may be different from a user interface 805 of the camera 800.

One skilled in the art will recognize that the particular configurations shown in FIGS. 6A and 6B are merely exemplary, and that other architectures are possible for camera 800. One skilled in the art will further recognize that several of the components shown in the configurations of FIGS. 6A and 6B are optional, and may be omitted or reconfigured.

Figure 7:
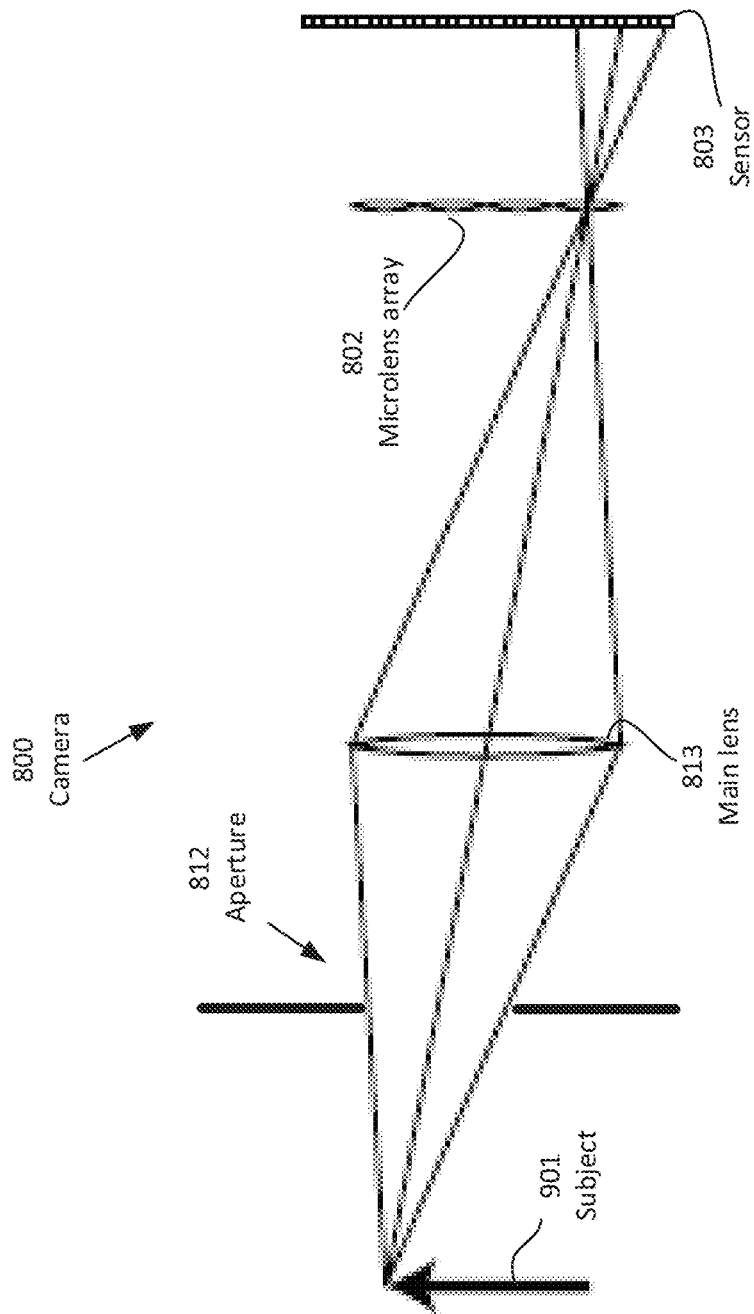
FIG. 7 depicts an example of an architecture for a light-field camera for implementing the present disclosure according to one embodiment.

In at least one embodiment, camera 800 may be a light-field camera that includes light-field image data acquisition device 809 having optics 801, image sensor 803 (including a plurality of individual sensors for capturing pixels), and microlens array 802. Optics 801 may include, for example, aperture 812 for allowing a selectable amount of light into camera 800, and main lens 813 for focusing light toward microlens array 802. In at least one embodiment, microlens array 802 may be disposed and/or incorporated in the optical path of camera 800 (between main lens 813 and sensor 803) so as to facilitate acquisition, capture, sampling of, recording, and/or obtaining light-field image data via sensor 803. Referring now also to FIG. 7, there is shown an example of an architecture for a light-field camera 800 for implementing the present disclosure according to one embodiment. The Figure is not shown to scale. FIG. 7 shows, in conceptual form, the relationship between aperture 812, main lens 813, microlens array 802, and sensor 803, as such components interact to capture light-field data for subject 901.

In at least one embodiment, light-field camera 800 may also include the user interface 805, which may allowing a user to provide input for controlling the operation of camera 800 for capturing, acquiring, storing, and/or processing image data.

In at least one embodiment, light-field camera 800 may also include control circuitry 810 for facilitating acquisition, sampling, recording, and/or obtaining light-field image data. For example, control circuitry 810 may manage and/or control (automatically or in response to user input) the acquisition timing, rate of acquisition, sampling, capturing, recording, and/or obtaining of light-field image data.

In at least one embodiment, camera 800 may include memory 811 for storing image data, such as output by image sensor 803. Such memory 811 can include external and/or internal memory. In at least one embodiment, memory 811 can be provided at a separate device and/or location from camera 800.

For example, camera 800 may store raw light-field image data, as output by sensor 803, and/or a representation thereof, such as a compressed image data file. In addition, as described in related U.S. Utility application Ser. No. 12/703,367 for "Light-field Camera Image, File and Configuration Data, and Method of Using, Storing and Communicating Same,", filed Feb. 10, 2010, memory 811 can also store data representing the characteristics, parameters, and/or configurations (collectively "configuration data") of device 809.

In at least one embodiment, captured image data is provided to post-processing circuitry 804. Such circuitry 804 may be disposed in or integrated into light-field image data acquisition device 809, as shown in FIG. 6A, or it may be in a separate component external to light-field image data acquisition device 809, as shown in FIG. 6B. Such separate component may be local or remote with respect to light-field image data acquisition device 809. Any suitable wired or wireless protocol can be used for transmitting image data 821 to post-processing circuitry 804; for example camera 800 can transmit image data 821 and/or other data via the Internet, a cellular data network, a WiFi network, a BlueTooth communication protocol, and/or any other suitable means.

Overview

Light-field images often include a plurality of projections (which may be circular or of other shapes) of aperture 812 of camera 800, each projection taken from a different vantage point on the camera's focal plane. The light-field image may be captured on sensor 803. The interposition of microlens array 802 between main lens 813 and sensor 803 causes images of aperture 812 to be formed on sensor 803, each microlens in array 802 projecting a small image of main-lens aperture 812 onto sensor 803. These aperture-shaped projections are referred to herein as disks, although they need not be circular in shape. The term "disk" is not intended to be limited to a circular region, but can refer to a region of any shape.

Light-field images include four dimensions of information describing light rays impinging on the focal plane of camera 800 (or other capture device). Two spatial dimensions (herein referred to as x and y) are represented by the disks themselves. For example, the spatial resolution of a light-field image with 120,000 disks, arranged in a Cartesian pattern 400 wide and 300 high, is 400×300. Two angular dimensions (herein referred to as u and v) are represented as the pixels within an individual disk. For example, the angular resolution of a light-field image with 100 pixels within each disk, arranged as a 10×10 Cartesian pattern, is 10×10. This light-field image has a 4-D (x,y,u,v) resolution of (400,300,10,10). Referring now to FIG. 1, there is shown an example of a 2-disk by 2-disk portion of such a light-field image, including depictions of disks 102 and individual pixels 203; for illustrative purposes, each disk 102 is ten pixels 203 across.

Figure 2:
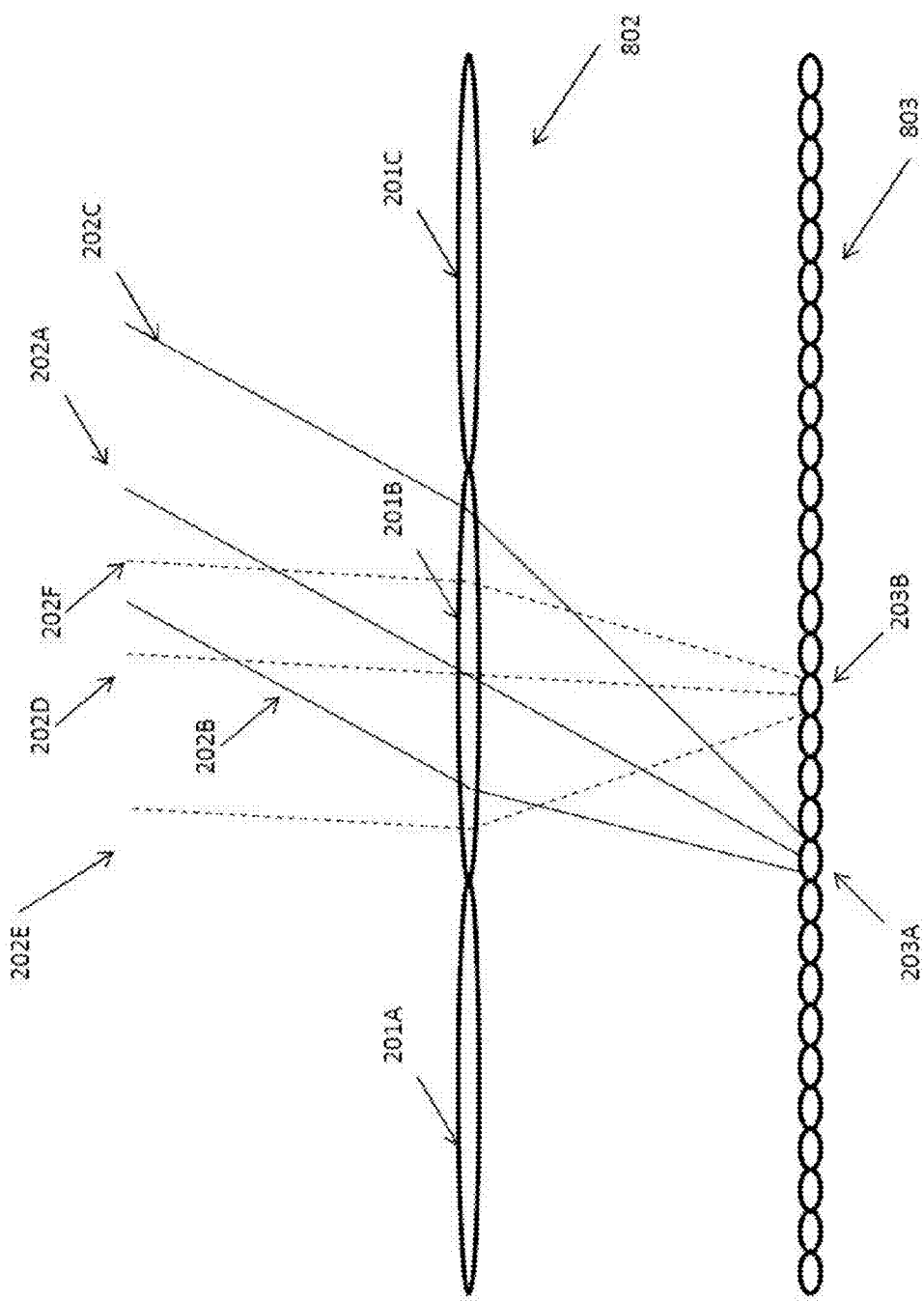
FIG. 2 depicts transmission of light rays through a microlens to illuminate pixels in a digital sensor.

Many light rays in the light-field within a light-field camera contribute to the illumination of a single pixel 203. Referring now to FIG. 2, there is shown an example of transmission of light rays 202, including representative rays 202A, 202D, through microlens 201B of array 802, to illuminate sensor pixels 203A, 203B in sensor 803.

In the example of FIG. 2, solid rays 202A, 202B, 202C illuminate sensor pixel 203A, while dashed rays 202D, 202E, 202F illuminate sensor pixel 203B. The value at each sensor pixel 203 is determined by the sum of the irradiance of all rays 202 that illuminate it. For illustrative and descriptive purposes, however, it may be useful to identify a single geometric ray 202 with each sensor pixel 203. That ray 202 may be chosen to be representative of all the rays 202 that illuminate that sensor pixel 203, and is therefore referred to herein as a representative ray 202. Such representative rays 202 may be chosen as those that pass through the center of a particular microlens 201, and that illuminate the center of a particular sensor pixel 203. In the example of FIG. 2, rays 202A and 202D are depicted as representative rays; both rays 202A, 202D pass through the center of microlens 201B, with ray 202A representing all rays 202 that illuminate sensor pixel 203A and ray 202D representing all rays 202 that illuminate sensor pixel 203B.

Figure 3:
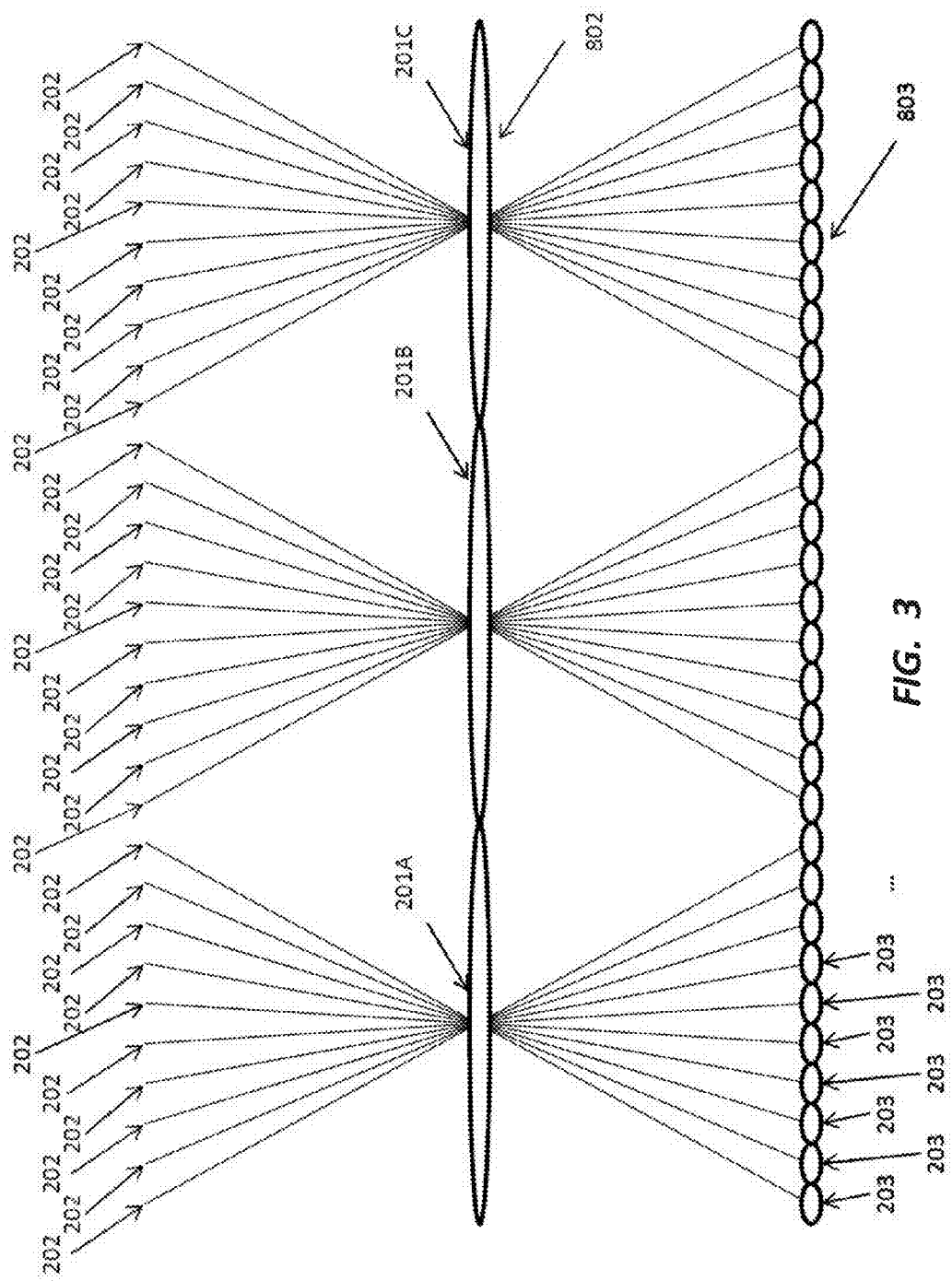
FIG. 3 depicts an arrangement of a light-field capture device wherein a microlens array is positioned such that images of a main-lens aperture, as projected onto the digital sensor, do not overlap.

There may be a one-to-one relationship between sensor pixels 203 and their representative rays 202. This relationship may be enforced by arranging the (apparent) size and position of main-lens aperture 812, relative to microlens array 802, such that images of aperture 812, as projected onto sensor 803, do not overlap. Referring now to FIG. 3, there is shown an example of an arrangement of a light-field capture device, such as camera 800, wherein microlens array 802 is positioned such that images of a main-lens aperture 812, as projected onto sensor 803, do not overlap. All rays 202 depicted in FIG. 3 are representative rays 202, as they all pass through the center of one of microlenses 201 to the center of a pixel 203 of sensor 803.

Figure 4:
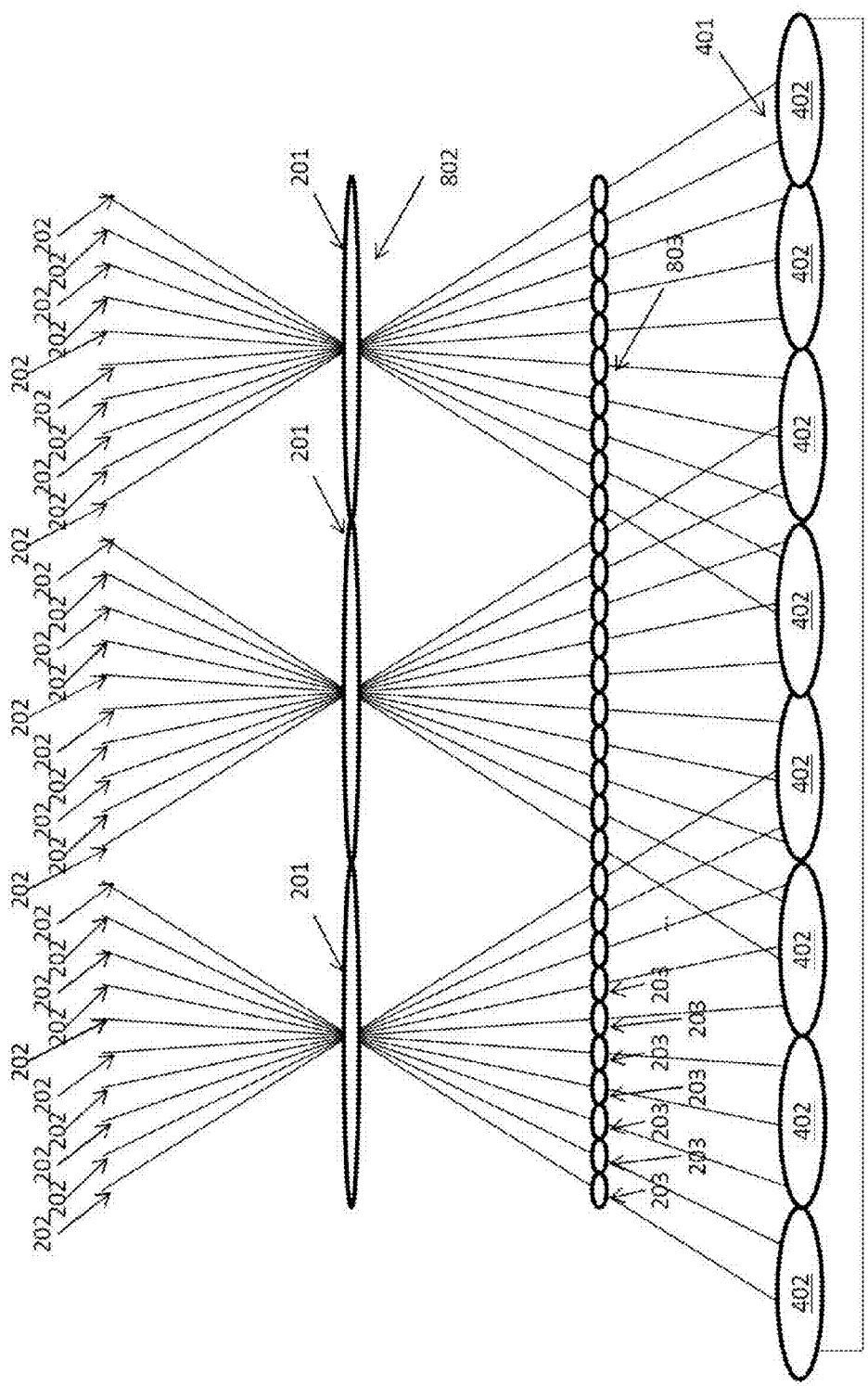
FIG. 4 depicts an example of projection and reconstruction to reduce a 4-D light-field representation to a 2-D image.

In at least one embodiment, the 4-D light-field representation may be reduced to a 2-D image through a process of projection and reconstruction. Referring now to FIG. 4, there is shown an example of such a process. A virtual surface of projection 401 may be introduced, and the intersection of each representative ray 202 with surface 401 is computed. Surface 401 may be planar or non-planar. If planar, it may be parallel to microlens array 802 and sensor 803, or it may not be parallel. In general, surface 401 may be positioned at any arbitrary location with respect to microlens array 802 and sensor 803. The color of each representative ray 202 may be taken to be equal to the color of its corresponding pixel. In at least one embodiment, pixels 203 of sensor 803 may include filters arranged in a regular pattern, such as a Bayer pattern, and converted to full-color pixels. Such conversion can take place prior to projection, so that projected rays 202 can be reconstructed without differentiation. Alternatively, separate reconstruction can be performed for each color channel.

The color of an image pixel 402 on projection surface 401 may be computed by summing the colors of representative rays 202 that intersect projection surface 401 within the domain of that image pixel 402. The domain may be within the boundary of the image pixel 402, or may extend beyond the boundary of the image pixel 402. The summation may be weighted, such that different representative rays 202 contribute different fractions to the sum. Ray weights may be assigned, for example, as a function of the location of the intersection between ray 202 and surface 401, relative to the center of a particular pixel 402. Any suitable weighting algorithm can be used, including for example a bilinear weighting algorithm, a bicubic weighting algorithm and/or a Gaussian weighting algorithm.

Artifacts Due to Incorrect Calibration

Existing light-field cameras can experience artifacts resulting from incorrect calibration of sensor 803. In at least one embodiment, the system of the present disclosure corrects such artifacts. Each pixel 203 on sensor 803 is illuminated by actual rays 202 of light that pass through microlens array 802. However, representative rays 202, as described above, are not actual rays of light, but are instead mathematical rays that are defined based on the geometric relationship of microlens array 802 and sensor 803. If representative rays 202 are to accurately represent the light that reaches a sensor pixel 203, the geometric relationship between microlens array 802 and pixels 203 on sensor 803 must be known to a sufficient degree of accuracy. If this relationship may vary from one sensor 803 to another, then calibration of each sensor 803 may serve to compensate for such variation. If the actual geometric relationship between microlens array 802 and sensor 803 differs from the (known) relationship indicated by calibration, images created by projecting the light-field image may contain unwanted artifacts.

Figure 5:
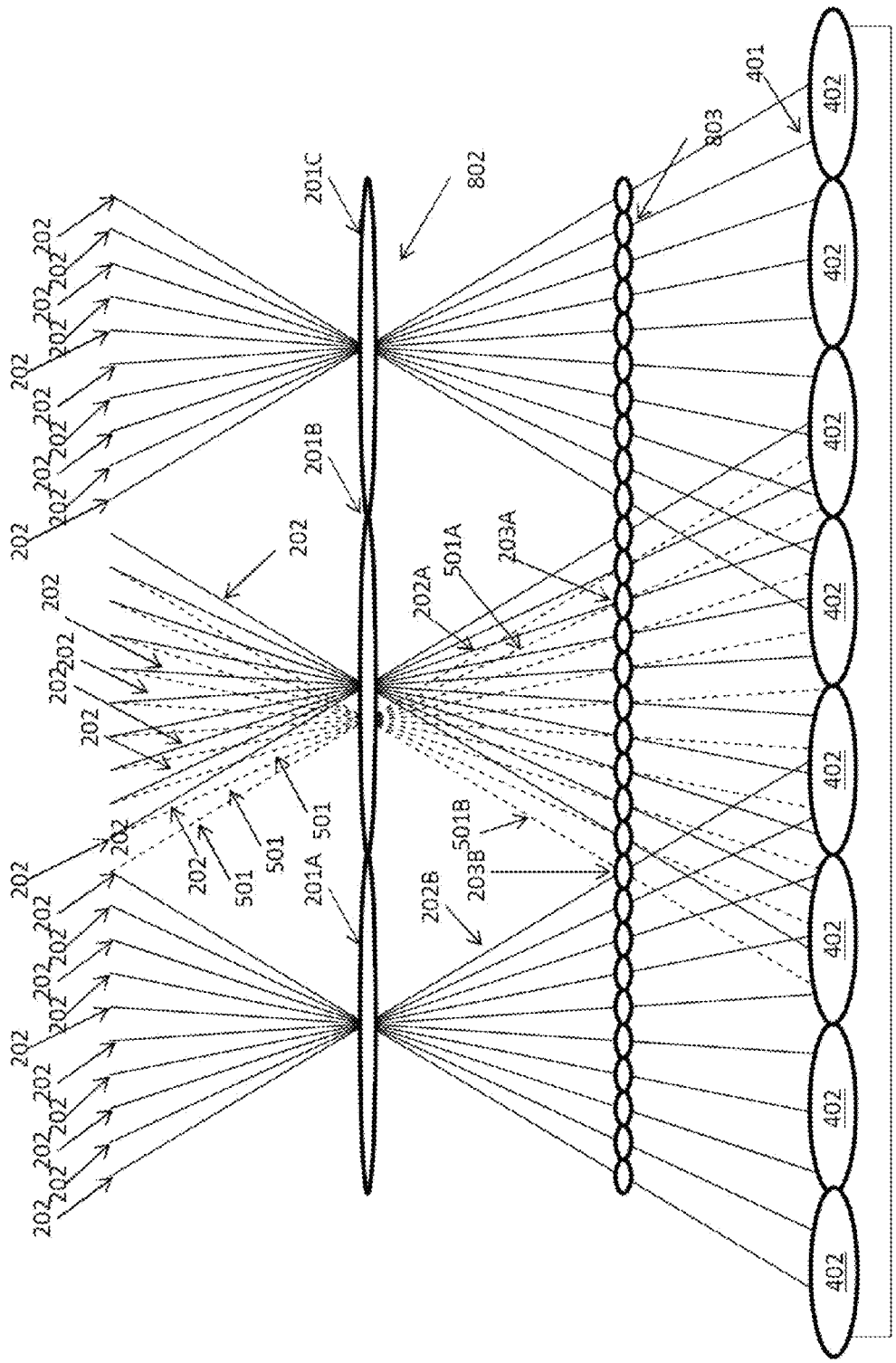
FIG. 5 depicts an example of incorrect calibration.

Referring now to FIG. 5, there is shown an example of incorrect calibration. Microlenses 201 and sensor pixels 203 are depicted in their calibrated geometric relationship—that is, as they are believed to be related. Representative rays 202, which pass through the calibrated microlens 201 centers and the centers of sensor pixels 203, are depicted with solid lines. In this example, the actual position of microlens 201B differs from the calibrated (expected) position. Actual light rays 501 that pass through the center of microlens 201B, and also pass through the centers of certain sensor pixels 203, are depicted with dashed lines. Thus the actual position of microlens 201B is centered at the point where the dashed lines representing actual light rays 501 intersect microlens 201B, rather than (as depicted) the point where the solid (representative) rays 202 intersect it. In this example, these positions differ by a distance equal to one-eighth of the microlens pitch.

One image artifact, referred to herein as geometric distortion, may result from the difference between 1) the representative ray 202 assigned to a sensor pixel 203 and 2) the actual light ray 501 that passes through the center of that sensor pixel 203 and the true center of the microlens 201 associated with that sensor pixel 203. This situation is illustrated by sensor pixel 203A in FIG. 5. The solid line passing through sensor pixel 203A is the representative ray 202A assigned to sensor pixel 203A. It passes through the calibrated center of microlens 201B, and through the center of sensor pixel 203A. The dashed line passing through the center of sensor pixel 203A is an actual light ray 501A, which passes through the true center of microlens 201B. During projection, the color of sensor pixel 203A will be projected along the path specified by the (solid) representative ray 202A passing through it. In actuality, however, light arrived at sensor pixel 203A from light rays surrounding dashed ray 501A, and should be projected along this path. This discrepancy between the projection and the actual light path causes artifacts.

The farther the rays are projected (that is, the greater the distance between the surface of sensor 803 and virtual projection surface 401) the greater the error due to divergence of each representative ray 202 from the corresponding actual ray. In the depicted example, although the distance between microlens array 802 and virtual projection surface 401 is not large (relative to the distance between microlens array 802 and the surface of sensor 803), representative ray 202A that passes through sensor pixel 203A intersects image pixel 402A, while the actual ray that passes through sensor pixel 203A intersects image pixel 402B. The farther virtual projection surface 401 is from microlens array 802, the greater the distance between the two intersections. This distance will manifest as geometric distortion in the projected image, the magnitude of the distortion being proportional to the distance between virtual projection surface 401 and microlens array 802. If projection to a range of surfaces 401 is animated (for example, as a focus sweep), regions of the resulting images in which calibration errors exist may sweep or twist across the field of view.

A second form of distortion, herein referred to as ghosting, may also result from incorrect microlens-position calibration. Ghosting is illustrated by sensor pixel 203B in FIG. 5. As in the case of sensor pixel 203A, representative ray 202B and actual light ray 501B passing through sensor pixel 203B follow different paths. Accordingly, geometric distortion, as described in the case of sensor pixel 203A, will result. But the difference between ray paths is much greater than for the rays that pass through sensor pixel 203A, because the two rays pass through different microlens centers—the representative ray passing through the pre-calibration center of microlens 201A, and the actual light ray passing through the true center of microlens 201B. This difference causes light passing through microlens 201B to be aggregated with light passing through sensor pixel 203B. The effect in projected images is adjacent duplicates of image features; hence the term "ghosting".

Light-field camera 800 may be designed so that small calibration errors result in geometric distortion, but do not cause ghosting. This may be accomplished, in at least one embodiment, by arranging the imaging geometry, including the geometry of sensor 803 and of the microlens array, so that disks 102 not only do not overlap, but are separated by a gap. Sensor pixels 203 are "assigned" to the nearest microlens 201 center, in calibrated coordinates, so gaps allow calibration errors up to half the gap size before a pixel's 203 assignment snaps to the incorrect microlens 201. Such a technique limits or eliminates ghosting, since, until such snapping occurs, calibration errors may result in only geometric distortion, rather than ghosting.

Disk-Center Calibration

Microlens 201 positions can be difficult to measure directly. However, they may be inferred from pixel values in the light-field image, which is readily available. Thus, in at least one embodiment, the key calibration problem is to identify the center of each disk 102 in the light-field image.

The center of a disk 102 is formally the point where a ray from the center of the exit pupil of the light-field camera's 800 main lens 813, which passes through the center of the corresponding microlens 201, intersects sensor 803. Assuming that the exit pupil is round, or nearly round, and that the light-field image is a modulation image, the center of a disk 102 may be approximated as the weighted-center of pixel values illuminated by rays passing through the corresponding microlens 201. The weighted-center of pixel values in the x dimension is the solution to $$0=\Sigma_i p_i(x_i-x_{center})$$ (Eq. 1)

for pixels 203 in the region i (those pixels 203 illuminated by rays passing through the corresponding microlens 201). In this equation, $x_i$ is the x coordinate of the pixel's 203 center, $p_i$ is the pixel's value, and $x_{center}$ is the x coordinate of the disk 102 center (that is being computed). The y coordinate of the weighted-center may be computed equivalently:

$$0=\Sigma_i p_i(y_i-y_{center})$$ (Eq. 2)

Figure 8:
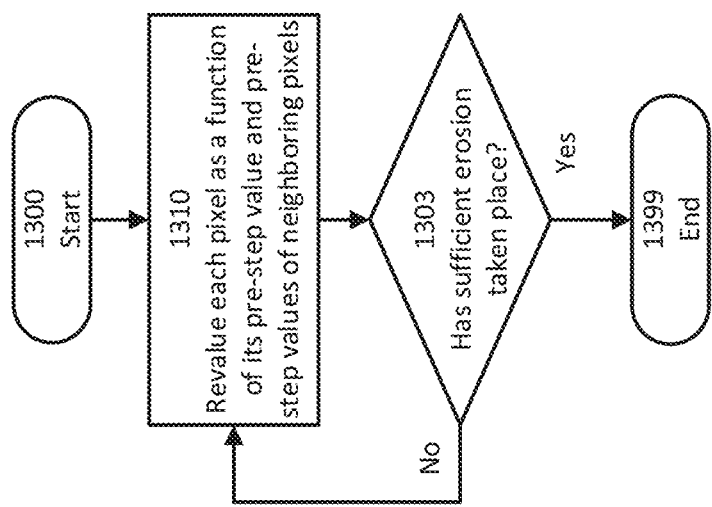
FIG. 8 is a flow diagram depicting an example of a method of grayscale image erosion, according to one embodiment.

With such a definition, however, it is necessary to know the disk 102 center, at least approximately, to determine which set of pixel values to consider when computing the weighted-center. (If pixels 203 corresponding to a different disk 102 are included in the weighted sum, the result will be incorrect.) In various embodiments, either of two general approaches can be used to estimate the center of a disk 102 prior to computing it more exactly using these equations. In a first embodiment, either of the following methods is performed:

1. Grayscale image erosion. Referring now to FIG. 8, there is shown an example of a method of grayscale image erosion, according to one embodiment. Grayscale image erosion is a morphological image processing technique that is well known in the art. A single morphological step 1301 revalues each pixel 203 in the image as a function of its pre-step value and the pre-step values of neighboring pixels 203. This serves to reduce (erode) the values of pixels 203 that are on the edge of groups of high-value pixels 203. A determination is made 1303 as to whether sufficient erosion has taken place; if not, step 1301 is repeated. Repeated erosion steps 1301 reliably reduce the light-field image to a pattern of 2×2-pixel illuminated regions (disks), with interstitial pixel values reduced (nearly) to zero. After erosion is complete 1399, these 2×2-pixel blocks can be identified, and their centers can be evaluated. (The equations given above reduce to linear interpolation for a 2×2-pixel block.)
2. Stepping. According to this method, a disk's 102 center is estimated by taking a grid step from the center of an accurately calibrated disk center. In a square tiling of microlenses 201, a grid step changes either x or y by the known microlens pitch. In a hexagonal tiling of microlenses 201, a grid step changes x and y in one of six directions, such that the distance moved is equal to the microlens pitch.

Figure 9:
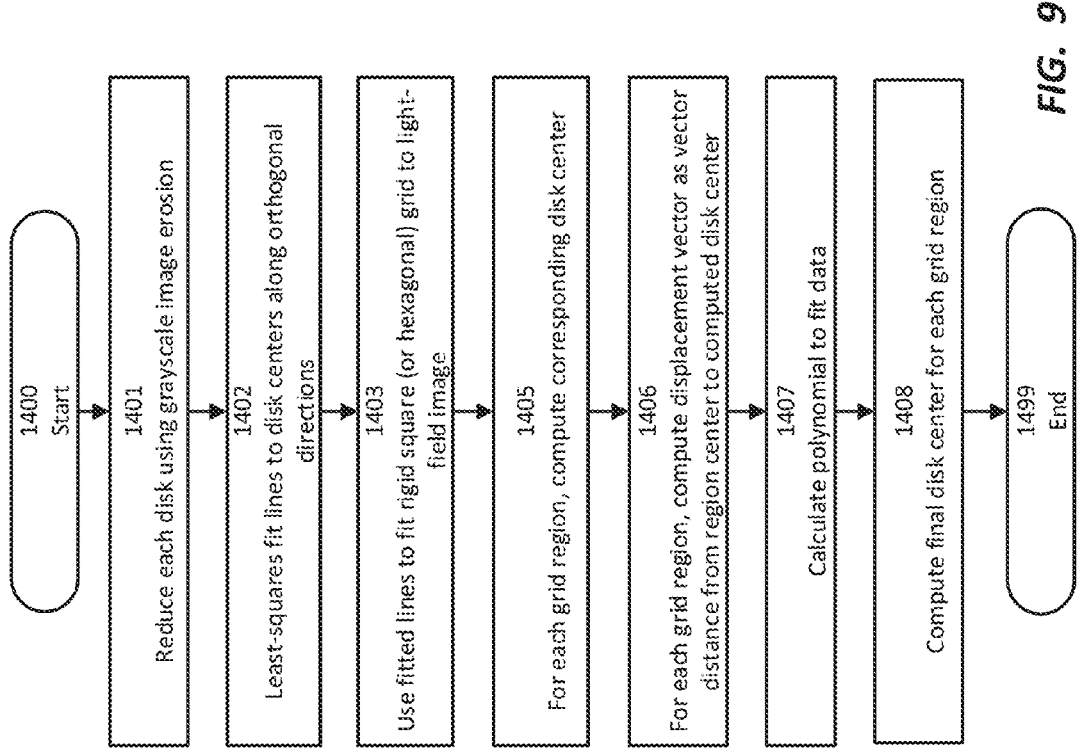
FIG. 9 is a flow diagram depicting an example of a method of gridded calibration, according to one embodiment.

In at least one embodiment, a technique referred to as gridded calibration is performed. Referring now to FIG. 9, there is shown an example of a method of gridded calibration, according to one embodiment. Each disk 102 in the light-field image is reduced 1401 to a roughly 2-pixel by 2-pixel point on a black background, using grayscale image erosion. A least-squares algorithm is applied 1402 to fit a small number of lines to the disk centers along orthogonal directions; these lines may be horizontal and vertical for a square grid, or at 60-degree angles for a hexagonal grid. Step 1402 may be implemented by fitting each line incrementally, first to a single disk center, then to additional disk centers at substantial incremental distances (for example, at 10-disk separations). In at least one embodiment, disks from defective microlenses are also detected and ignored during the mapping in order to prevent inaccurate mapping. Defective disks can include, but are not limited to, those that are decentered by greater than half of the disk pitch or have low transmission.

From the fitted lines generated in step 1402, a rigid square or hexagonal grid (as appropriate) is fitted 1403 to the entire light-field image.

For each grid region (such as a square or hexagonal region), the corresponding disk center is computed 1405 by passing all values for pixels 203 within that grid region into the weighted-center equations.

For each grid region, a vector distance is computed 1406 from the geometric center of the region to the computed disk center. This vector is assigned as the displacement associated with the corresponding disk center.

A 2D polynomial equation is calculated 1407 to fit the data describing the displacement vectors. In at least one embodiment, a third-order polynomial equation used, although any desired polynomial order can be used. The polynomial coefficients are determined via regression, such as the method of least squares. The fitting of the data to a polynomial has the effect of compressing the calculated data, as it can now be stored parametrically; it also serves to smooth the data to reduce errors in the gridded or stepping-based calibration.

In another embodiment, instead of or in addition to calculating a 2D polynomial 1407, a spatial filter is applied to the spatial array of displacement vectors. Any of a number of known and suitable filters, such as Gaussian and Box, can be used. Optimizations such as bucketing may also be employed. In at least one embodiment, a square filter is employed.

For each grid region, the final disk center is computed 1408 as the vector sum of the grid region's geometric center and displacement vector. The method ends 1499.

Figure 10:
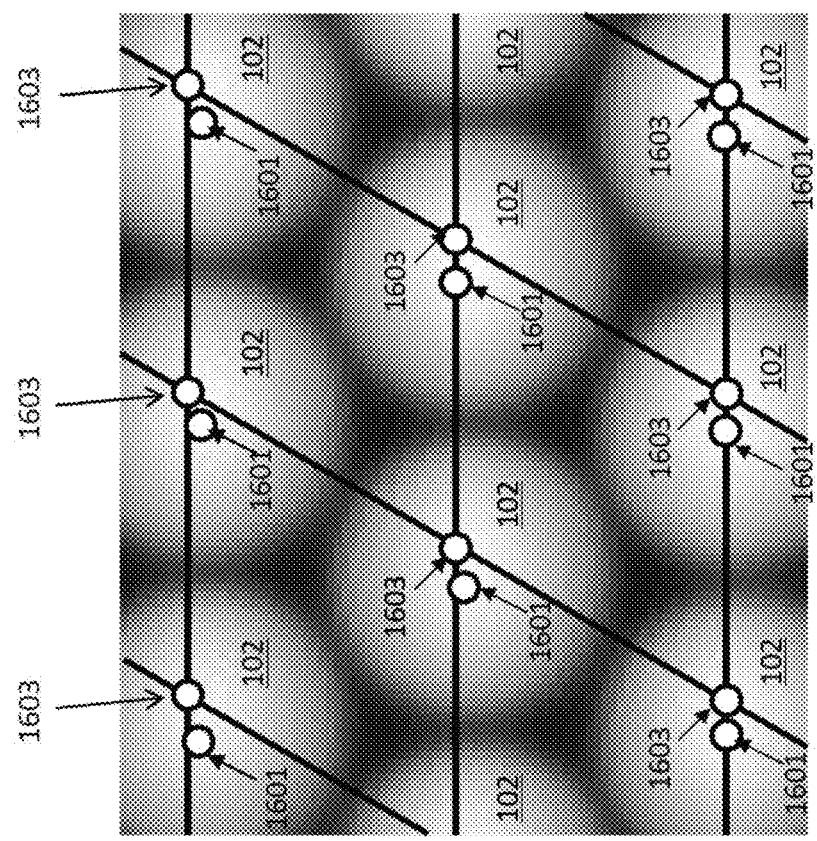
FIG. 10 depicts an example of gridded calibration in a hexagonal grid, according to one embodiment.

Referring now to FIG. 10, there is shown an example of gridded calibration in a hexagonal grid, according to one embodiment. A weighted center 1601 has been computed for each disk 102. Application of grid 1602 (using, for example, a least-squares algorithm) yields ideal position 1603 for each disk 102. A similar technique can be used for square grids.

In at least one embodiment, several steps of gridded calibration can be performed in parallel, allowing for efficient and high-performance implementation. In at least one embodiment, the primary limitation of the above-described gridded calibration method is that only small errors (displacement-vector magnitude less than half the pitch of microlens array 802) may be computed accurately. If manufacturing tolerances cannot be held to this tight standard, gridded calibration may fail to compute a correct calibration.

A second form of calibration, herein referred to as incremental calibration, may also operate on a modulation image, as is described in the above-cited related U.S. Provisional Application. Incremental calibration overcomes the primary shortcoming of gridded calibration, which is its inability to handle error vectors with magnitudes greater than half the microlens pitch. It does so by first calibrating a single disk, and then growing a region of calibrated disks around this initial disk, taking incremental (e.g., one-microlens) steps. From the initial microlens position, an incrementally larger area is considered, for example one that includes four microlenses. The gridded calibration is performed on this slightly larger array of microlenses. The gridding area is iteratively increased, and the gridded calibration is performed on each iteratively increased area, until the full microlens array is included. As long as the relative error of adjacent disks remains below some threshold, which may be fairly large, the correct 1-to-1 mapping of pre-calibration and post-calibration disks is ensured. After all disk centers have been calibrated, the calibrated centers are filtered with steps equivalent to steps 1406 to 1408 described above, wherein the displacement vectors may have magnitudes greater than half the microlens pitch.

A modulation image is an image that is computed from a flat-field image by normalizing based on average values (per color channel). For example, a modulation image may be an image of a uniform flat white scene. Ideally this would produce a corresponding uniform white image. However, due to non-idealities in an imaging system, such as vignetting, angular sensitivity of detectors, and the sensor fill factor of the microlens array, resultant images may have variations in intensity. To compensate for these non-idealities, the inverse of a modulation image can be applied to any image to correct for the intensity variation.

Additional details are provided in U.S. Provisional Application Ser. No. 61/604,155 for "Compensating for Sensor Saturation and Microlens Modulation During Light-Field Image Processing", filed on Feb. 28, 2012, the disclosure of which is incorporated herein by reference in its entirety.

Modulation images may vary as a function of camera parameters such as zoom, focus, and f-stop. Thus, in at least one embodiment, disk-center calibration is based on an appropriate modulation image.

In at least one embodiment, both gridded calibration and incremental calibration assume that the true center of a disk 102 corresponds to its pixel-weighted center. This may not be true in the case of vignetting, especially vignetting that is due to occlusion of the main-lens exit pupil. Such occlusion rarely occurs for disks 102 near the center of the light-field image, but may be common for disks 102 near the edge (or, especially, the corner) of the light-field image. Because such occlusion may vary slowly across the light-field image, and may vary little from one camera of the same design to another, it may be modeled as an invariant field for cameras of the same design. Both algorithms (gridded calibration and incremental calibration) may be modified to account for such occlusion vignetting by adding a step in which each calibrated disk center is perturbed to account for vignetting, by 1) resampling the vignetting field (which may itself be defined as a regular pattern of displacement vectors), and 2) adding the sampled displacement vector to the disk center.

Application of Calibration Data

Figure 11:
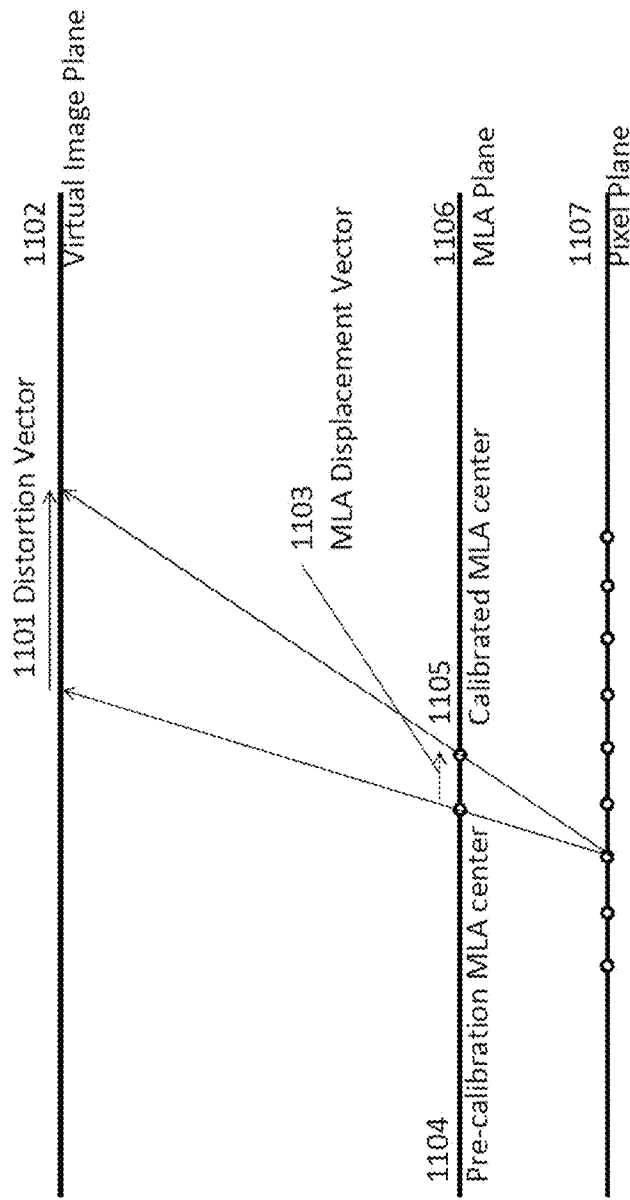
FIG. 11 depicts an example of the geometric relationship between projection depth and displacement vector between pre- and post-calibrated microlens centers.

After calibrated disk centers are computed, they may be employed in at least two ways:
1. Projection. Once calibrated representative rays 202 have been computed, they may be projected as described above. Representative rays 202 may be computed from calibrated disk centers in at least two different ways:
   a. Perspective. For each disk 102, the corresponding microlens 201 center may be computed by casting a ray 202 from the disk center to the center of the main-lens exit pupil, and then finding the intersection of this ray 202 with the surface of microlens array 802. A true representative ray 202 may then be determined for each pixel 402 in the light-field image as the ray 202 that extends from the corresponding microlens 201 center through the center of the sensor pixel 203.
   b. Orthographic. Each disk 102 may be treated as though it is at the center of microlens array 802, or equivalently, that its center is coincident with the optical axis of main lens 813. In this approximation, disk centers and microlens centers are the same in two coordinates; they differ only in the dimension that is parallel to the main lens optical axis. Equivalently, for each disk 102, the corresponding microlens center may be computed by casting a ray from the disk center directly up toward microlens array 802, and then finding the intersection of this ray with the surface of microlens array 802. An orthographic representative ray 202 may then be found for each image pixel 402 in the light-field image as the ray that extends from the corresponding microlens 201 center through the center of the sensor pixel 203.
2. Warping. Projection may also be computed using representative rays 202 that pass through pre-calibration microlens centers. In this case, regions in the image are distorted as a predictable function of their depth, based on a geometric relationship between the projection depth and the displacement vector between the pre- and post-calibrated microlens centers. Referring now to FIG. 11, there is shown an example of this relationship. MLA displacement vector 1103 represents the shift in MLA center position along MLA plane 1106, from pre-calibration MLA center 1104 to calibrated MLA center 1105. Distortion vector 1101 has a magnitude based on the geometric relationship between a) the distance from pixel plane 1107 to MLA plane 1106; b) the distance from MLA plane 1106 to virtual image plane 1102, and c) the magnitude of MLA displacement vector 1103. In an extended depth of field image, a depth map is used to project to many virtual surfaces at different depths based on a calculated depth map; thus the distance from MLA plane 1106 to virtual image plane 1102 differs depending on which virtual image is being projected to. A depth map may be computed using techniques that are known in the art. Using this depth map and known magnitude of MLA displacement vector 1103, a distortion vector 1101 may be estimated for each pixel in the projected image. The distortion vector is then applied to each pixel in the projected image to correct the distortion at each pixel.

Influence

In at least one embodiment, representative rays 202 that pass through the centers of pixels 203 which are themselves near the centers of disks 102 may be given more influence in the reconstructed 2-D image than representative rays that pass through pixels 203 that lie near the edge of disks 102. An influence value may be assigned to each representative ray 202. This influence value may be computed as a function of sensor-pixel location and of other parameters. In such an embodiment, each pixel 402 in the 2-D image may include an influence value, in addition to the values of its color components. During reconstruction, color components are multiplied by the filter coefficient (as described above) and also by the ray's influence value, before they are summed into the 2-D image pixel 402. The product of the filter coefficient and the ray's 202 influence value is then summed to the 2-D pixel's influence value. When all representative rays have been processed, the color components in each 2-D image pixel are normalized, meaning that they are divided by the 2-D pixel's influence value. After normalization of a pixel is complete, that pixel's influence value may be discarded.

Any of a number of different functions may be employed to compute influence values. In at least one embodiment, for example, each representative ray's 202 influence value is set to the value of a corresponding pixel in the modulation image. This corresponding pixel is the pixel 203 through which the representative ray 202 passes.

Influence Based on Noise Function

In at least one embodiment, the influence value is determined based on a function that takes noise into account. In the projection process, if all sensor pixels 203 {$L_i$|i=1, ..., N} reaching the same image pixel 402 are assumed to come from the same physical point in the scene, and if they are equally affected by the optical and electrical system and thus have identical signal strength and noise level, an estimate of the pixel value of that image pixel 402, say p, is $$\tilde{p} = \frac{\sum L_i}{N} \quad \text{(Eq. 3)}$$

This assumes that sensor pixels 203 are demodulated to begin with. Let $m_i$ denote the modulation factor for i-th sample. $m_i$ can be obtained from the modulation image. The imaging system can apply an analog or digital gain factor g to the sensed signal, before storing pixel values in digital form. Each sensor pixel 203 may also be affected by noise $N_i$. Combining all these factors together, the sensor pixel value $E_i$ is related to the ideal sensor pixel value $L_i$ by the equation:

$$E_i = gm_iL_i + N_i \quad \text{(Eq. 4)}$$

Given the noisy and scaled signal, the task is to find the optimal estimate of p. The "optimality" of the estimate can be defined as the expected difference between the estimate and the true value. To compute the estimate or measure its optimality, the noise characteristics of the system can be modeled. In the imaging system, the noise $N_i$ usually has zero-mean, and its variance can be decoupled into two main components, including one that depends on the ideal sensor pixel value $L_i$, and another that is signal-independent, as follows:

$$v_{E_i}^2 = g^2(m_iL_i) + v_C^2 \quad \text{(Eq. 5)}$$

Given this model, the estimate of Li and its variance can be calculated:

$$\tilde{L}_i = \frac{E_i}{gm_i}, v_{\tilde{L}_i}^2 = \frac{v_{E_i}^2}{g^2m_i^2} \quad \text{(Eq. 6)}$$

Note that this calculation is the so-called demodulation process. Then, using the statistical estimation technique, the optimal estimate of p can be calculated from an estimated {Li} as $$\tilde{p} = \left(\sum \frac{1}{v_{\tilde{L}_i}^2}\tilde{L}_i\right)\left(\sum \frac{1}{v_{\tilde{L}_i}^2}\right)^{-1} \quad \text{(Eq. 7)}$$

Thus, samples with lower variance tend to have higher influence in the estimation process. If the influence of each sensor pixel 203 is defined as wi, the optimal influence value can be expressed as:

$$w_i = v_{(\tilde{L}_i)}^{-2} = \frac{g^2m_i^2}{v_{E_i}^2} = \frac{g^2m_i^2}{\{g^2(m_iL_i) + v_C^2\}} \quad \text{(Eq. 8)}$$

This particular formulation is merely exemplary. In various other embodiments, the system of the present disclosure can use other techniques for taking noise into account in determining influence for pixels 203 at different positions within disks 102. Different techniques may be applicable for different imaging systems. For example, if a sensor pixel 203 is defective or is clamped due to saturation, there may be no way to infer the original pixel Li value from the corrupted data Ei. In this case, the variance of this sensor pixel 203 can be modeled as infinite, and thus the influence would be zero. Alternatively, if there is no signal-dependent component in the noise, the optimal influence would be:

$$w_i = \frac{g^2m_i^2}{v_C^2} \quad \text{(Eq. 9)}$$

Infilling

After projection of rays to the 2-D image is complete, but prior to normalization of influence values, it may be determined that some pixels 402 in this 2-D image have reconstructed influence values that are either zero (because no rays 202 contributed to this pixel 402) or are substantially lower than the influence values of other pixels 402. Such a finding indicates that there are gaps, or "holes", in the reconstructed 2-D image. These holes (which may be due to insufficient sampling, perhaps as a result of irregularities in the sampling pattern due to variations in the positions of microlenses) may be eliminated by a process of infilling: using the values of nearby pixels 402 to estimate the value of pixels 402 in the "hole". Infilling techniques are described in related U.S. Utility application Ser. No. 13/688,026 for "Compensating for Variation in Microlens Position During Light-Field Image Processing", filed on Nov. 28, 2012, the disclosure of which is incorporated herein by reference in its entirety Depth Map Generation A depth map is a set of image-side points (points on the image side of main lens 813), each of which corresponds to a visible point in the scene. A point in the scene is visible if light emitted from it reaches the anterior nodal point of main lens 813, either directly or by being reflected from a highly specular surface. The correspondence is such that light emitted from the scene point would be in best focus by main lens 813 at the corresponding image-side point. In at least one embodiment, the optical effects of microlens array 802 (primarily refraction and reflection) and of sensor 803 (primarily occlusion) are not taken into account for the calculation of best focus; it is as though these optical elements were not present.

The position of an image-side point in a depth map may be specified in Cartesian coordinates, with x and y indicating position as projected onto sensor 803 (x positive to the right, y positive up, when viewing toward the scene along the optical axis of main lens 813), and depth d indicating perpendicular distance from the surface of microlens array 802 (positive toward the scene, negative away from the scene). The units of x and y may be pixels—the pixel pitch of sensor 803. The units of d may be lambdas, where a distance of one lambda corresponds to the distance along which a cone of light from any scene point changes its diameter by a value equal to the pitch of microlens array 802. (The pitch of microlens array 802 is the average distance between the centers of adjacent microlenses 201.)

Depth maps are known in the art. See, for example: J. Sun, H.-Y. Shum and N.-N. Zheng, "Stereo Matching using Belief Propagation," IEEE Transactions on Pattern Analysis and Machine Intelligence, vol. 25, no. 7, pp. 787-800, 2003; and C.-K. Liang, T.-H. Lin, B.-Y. Wong, C. Liu, and H. Chen, "Programmable Aperture Photography: Multiplexed Light-field Acquisition," ACM TRANS. GRAPH. 27, 3, Article 55, 2008.

The following observations can be made concerning scene-side points that are directly visible to main lens 813:

Points at scene depths on the plane of best focus in the scene correspond to an image depth at the (microlens) surface, or plane, of sensor 803.

Points at scene depths that are farther from camera 800 than the plane of best focus correspond to points with image depths that are closer to the main lens 802 than the plane of best focus, and therefore that have positive depth values.

Points at scene depths that are nearer to the camera 800 than the plane of best focus correspond to points with image depths that are further from the main lens 802 than the plane of best focus, and therefore that have negative depth values.

A depth map may be computed using techniques that are known in the art. The depth map may include image depth values at points with a regular distribution in x and y, and thus may be treated as a height field. The sample density of this height field, in the x and y dimensions, may roughly correspond to the distribution of microlens centers, or it may be greater or smaller.

Assigning Depth Values to Representative Rays

A depth value may be assigned to each representative ray 202 by intersecting that ray 202 with the image depth height field. If the representative ray 202 intersects the height field at multiple locations, the intersection that is farthest behind microlens 802 surface is selected. (This corresponds to the scene intersection that is nearest to camera 800.) The depth value at this intersection is assigned to representative ray 202. If there is no intersection, representative ray 202 may be discarded, or it may be assigned a depth value by another means. For example, it may be assigned a depth value computed from depth values assigned to nearby rays 202.

Algorithms for computing the intersection of a ray 202 with a height field are known in the art. For example, a ray 202 may intersect a height-field point if it passes within a threshold distance of that point. Alternatively, the height-field points may be interpreted as control points for a surface, and ray 202 can be intersected with that surface.

Calibration Challenges

As mentioned previously, effects such as shading, vignetting, and/or eclipse may be caused by the lens system and/or the aperture of the camera. Such effects may pose challenges for many calibration techniques. Calibration of a light-field camera may be performed using a known target, such as a flat, white wall. One example is shown in FIGS. 12 through 15C.

Figure 12:
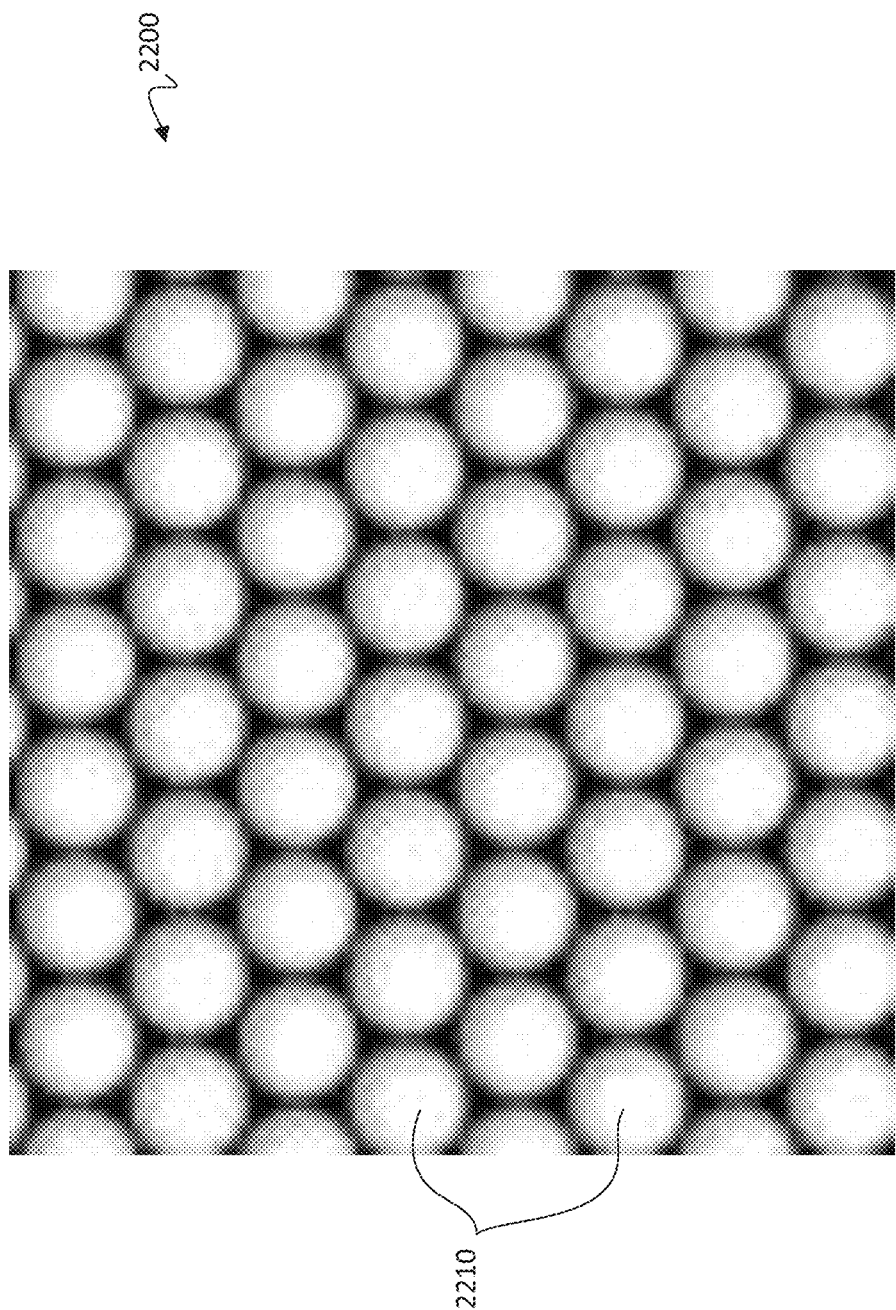
FIG. 12 is an image that illustrates a crop from the center of a calibration image for a light-field camera, according to one embodiment.

FIG. 12 is an image 2200 that illustrates a 100-by-100 pixel crop from the center of a calibration image for a light-field camera. Each of the white disks in the image 2200 is the image of the white field (i.e., light-field data captured for calibration purposes, based on light that may be reflected or directly received from an illumination source that is uniform spatially, angularly, and spectrally) captured by a single microlens, i.e., a microlens portion 2210 captured by one microlens of the microlens array 802 of FIG. 7. The arrangement of the microlens portions 2210 represents the structure of the microlens array 802.

Some calibration methods may commence calibration by finding the intensity peak of each microlens portion 2210 as the center of the microlens and then further refine those centers into a globally consistent grid model. Other approaches may convert the image 2200 into the frequency domain and search for the peak value to determine the global grid model.

All of these methods may suffer from a few problems in practice. First, the location of the intensity peak (the brightest pixel) in the microlens portion 2210, or even the weighted geometric center of the microlens portion 2210, may not be an accurate estimate of the physical microlens center. Even if microlenses may be physically identical, because the pixel intensity varies with the incident angle of the incoming light rays, the brightness distribution of a microlens may depend on its location on the image/sensor plane.

Figure 13:
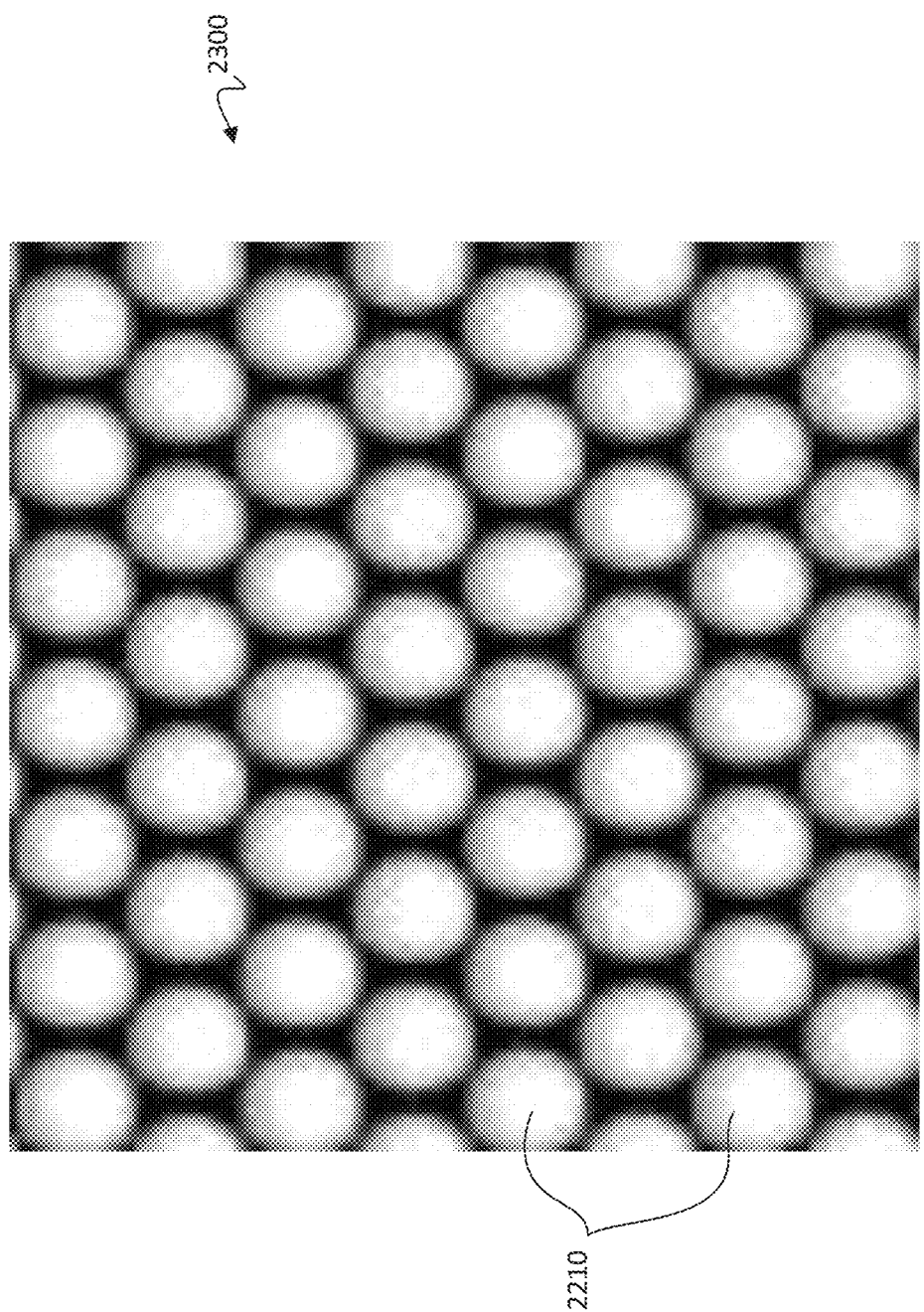
FIG. 13 is an image that illustrates a crop displaced from the center of a calibration image for a light-field camera, according to one embodiment.

One example of this phenomenon is shown in FIG. 13. FIG. 13 is an image 2300 that illustrates a 100-by-100 pixel crop displaced from the center of a calibration image for a light-field camera. The image 2300 may be cropped from the same calibration image as the image 2200. The brightness distribution is visibly shifted toward the right (toward the center of the calibration light-field image); this brightness differential may cause significant bias to the calibration. This effect may be yet more severe at image corners, where rays can be blocked by the finite support of the optical elements. When this happen, some portion of the microlens portion 2210 may be totally black, and the true disk center may be outside the bright region.

Figure 14:
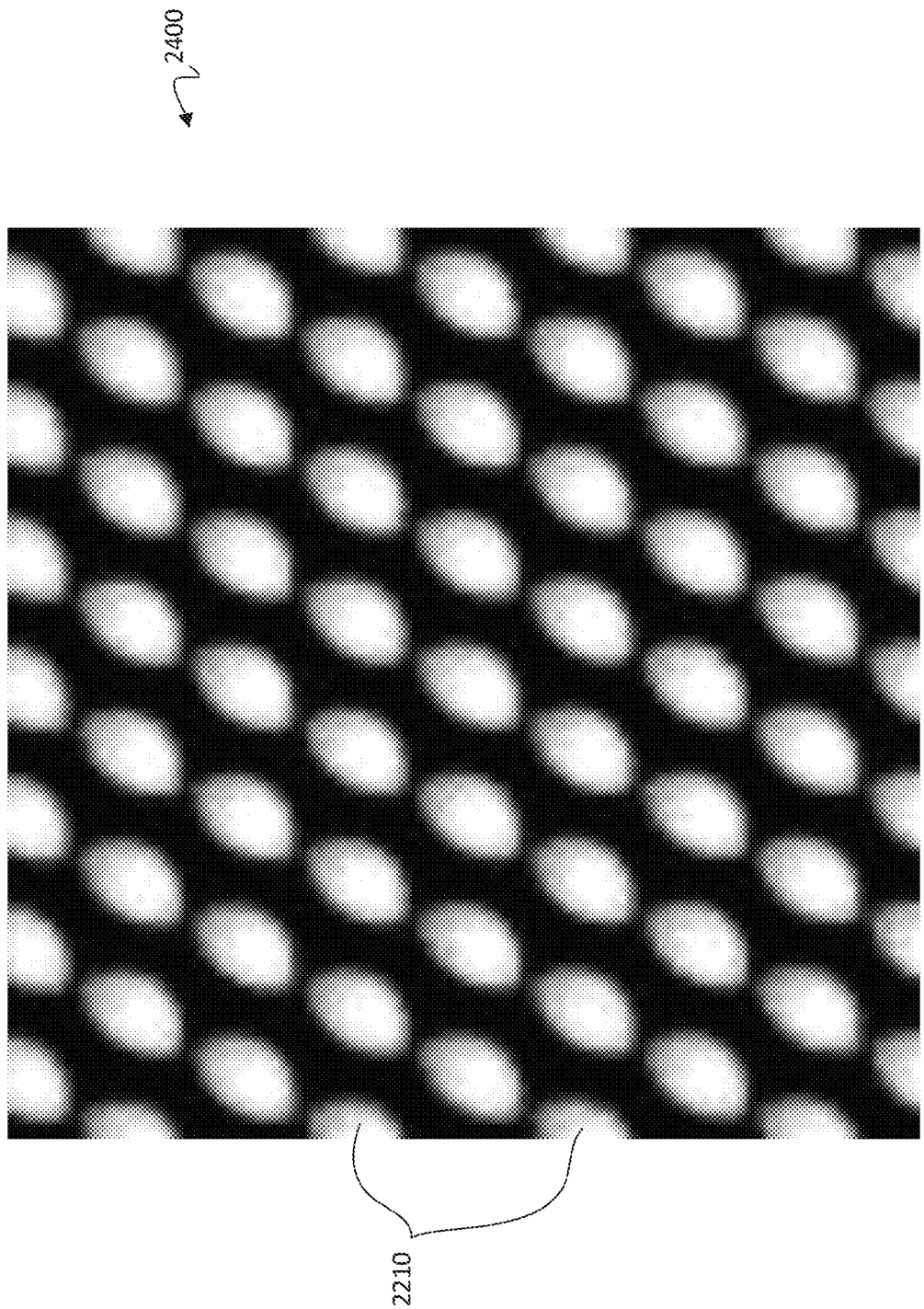
FIG. 14 is an image that illustrates a crop displaced from the center, toward the top left corner of a calibration image for a light-field camera, according to one embodiment.

One example is shown in FIG. 14. FIG. 14 is an image 2400 that illustrates a 100-by-100 pixel crop displaced from the center, toward the top left corner of a calibration image for a light-field camera. Each microlens portion 2210 now appears like a cat eye with highly uneven brightness distribution. In optics, the intensity variation and the ray blocking are collectively called "vignetting." Without treating the vignetting effect properly, the calibration results may be unacceptable, as will be illustrated in FIGS. 15A through 15C.

Figures 15A, 15B, 15C:
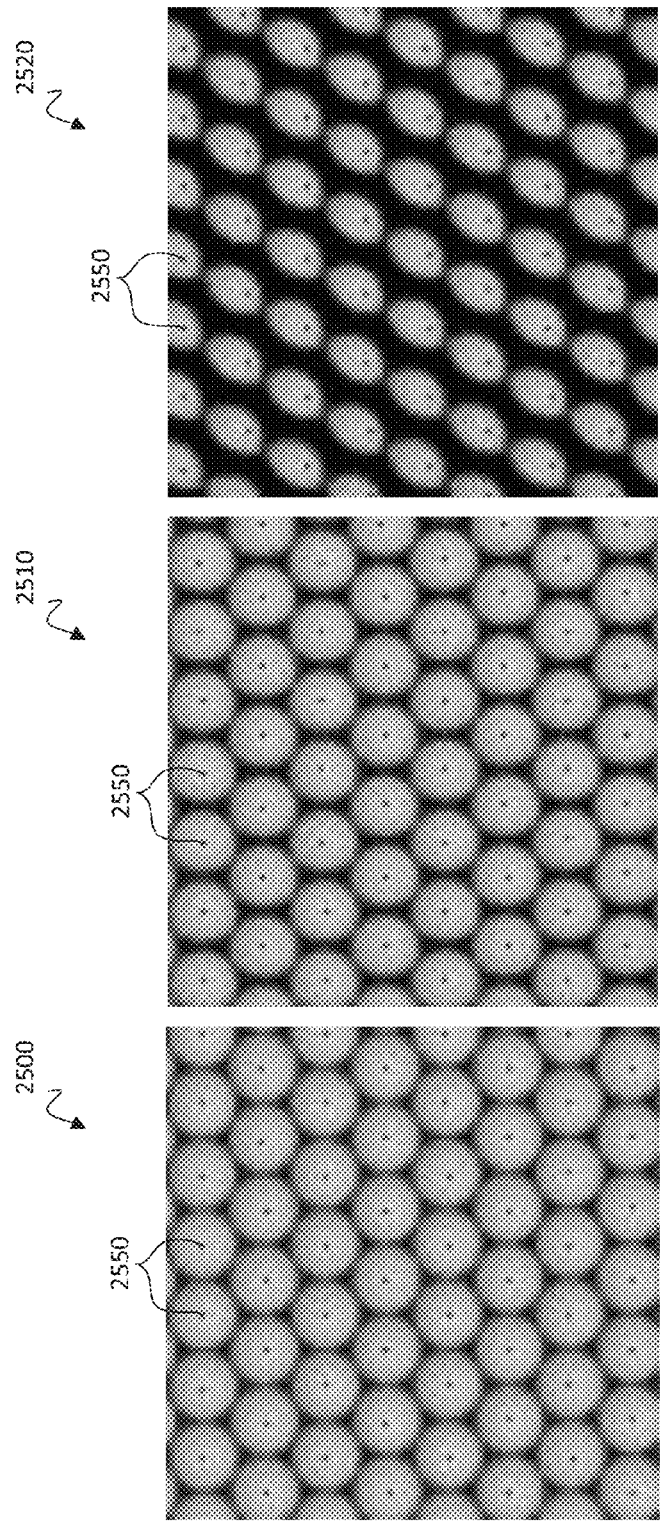
FIGS. 15A through 15C illustrate images that are the crops of FIGS. 12, 13, and 14, respectively, after performance of certain calibration methods, according to one embodiment.

FIGS. 15A through 15C illustrate images 2500, 2510, and 2520, respectively, which are the 100-by-100 pixel crops of FIGS. 12, 13, and 14, respectively, after performance of certain calibration methods. FIGS. 15A through 15C illustrate locations of centers 2550 of the microlens portions 2210, as determined by the calibration methods.

As shown in FIG. 15A, the calibration quality at the image center may be very good. However, bias may be introduced when the brightness distribution is not even, as in FIG. 15B. When a large portion of the disk is affected by ray blocking, as in FIG. 15C, known algorithms may generate unusable results due to the erroneous location of the centers 2550.

Global Microlens Position Determination

For microlens portions 2210 affected by vignetting and/or shading, an enhanced global calibration may use the interstitial spaces between microlens portions 2210 to obtain a more accurate location of the center of each microlens portion 2210. One manner in which this may be carried out will be shown and described in connection with FIGS. 16 through 20.

Figure 16:
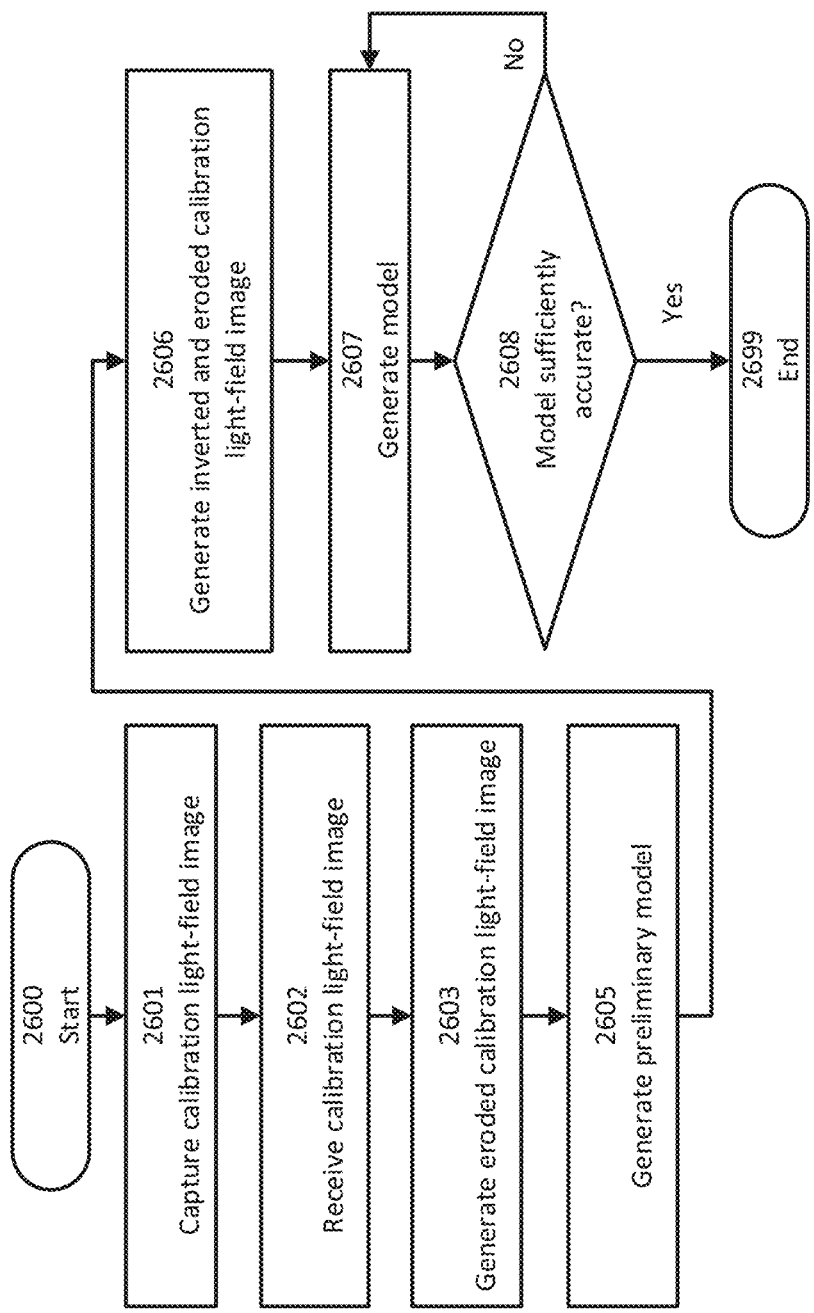
FIG. 16 is a flowchart diagram illustrating a method of developing a model indicative of the positions and/or orientations of the microlenses of a microlens array of a light-field image capture device, such as the camera of FIGS. 6A and/or 6B.

FIG. 16 is a flowchart diagram illustrating a method of developing a model indicative of the positions and/or orientations of the microlenses of a microlens array of a light-field image capture device, such as the camera 800 of FIGS. 6A and/or 6B. The method may be performed, for example, with circuitry such as the post-processing circuitry 804 of the camera 800 of FIG. 6A or the post-processing circuitry 804 of the post-processing system 850 of FIG. 6B, which is independent of the camera 800. In some embodiments, a computing device may carry out the method; such a computing device may include one or more of desktop computers, laptop computers, smartphones, tablets, cameras, and/or other devices that process digital information. The following description will reference the camera 800 of FIGS. 6A and 6B; however, those of skill in the art will recognize that the method of FIG. 16 may also be used with cameras (or other devices) having different configurations from the exemplary configuration of the camera 800 disclosed herein.

The method may start 2600 with a step 2601 in which the calibration light-field image is captured, for example, by the sensor 803 of the camera 800. In a step 2602, the image may be received in a computing device, which may be the camera 800 as in FIG. 6A. Alternatively, the computing device may be separate from the camera 800 as in the post-processing system 850 of FIG. 6B, and may be any type of computing device, including but not limited to desktop computers, laptop computers, smartphones, tablets, and the like.

In a step 2603, the calibration light-field image may be used to generate an eroded calibration light-field image. In a step 2605, the eroded calibration light-field image may be used to generate a preliminary model indicative of the positions of the microlenses of the microlens array 802 of the camera 800, relative to the image sensor 203 of the camera 800. This may be done by directly identifying the centers of the microlens portions 2210 of the eroded calibration light-field image (for example, as the highest intensity locations in each of the microlens portions 2210, as indicated previously). Additionally or alternatively, any known calibration method may be used to generate the preliminary model, which may be modified and/or refined in subsequent steps.

In a step 2606, the calibration light-field image and/or the eroded calibration light-field image may be used to generate an inverted and eroded calibration light-field image. The inverted and eroded calibration light-field image may be used to generate a model that is more accurately indicative of the positions of the microlenses than the preliminary model. The centers of the microlens portions may be located with accuracy in the inverted and eroded calibration light-field image by identifying the interstitial spaces between the microlens portions, as will be described subsequently.

After the model has been generated, in a query 2608, a determination may be made as to whether the model is sufficiently accurate. If so, the method may end 2699. However, if greater accuracy is needed, the method may return to the step 2607, and further analysis of the inverted and eroded calibration light-field image may be undertaken to generate a new model with greater accuracy. The previously generated model may be used in performance of the step 2607 to provide for greater accuracy with each iteration.

The step 2607 may iterate until one or more criteria are met. Such criteria may relate to the number of iterations of the step 2607 that have been carried out, the magnitude of the change between iterations of the model, and/or the like. Additionally or alternatively, such criteria may include satisfaction of a test, such as the generation and automated or human assessment of a light-field image obtained with the camera 800 with the model used to provide calibration settings. Such criteria may be used to conduct the query 2608. Alternatively, step 2608 can be omitted, in which case step 2607 is not iterated.

In alternative embodiments, the various steps of the method of FIG. 16 may be reordered, omitted, supplemented, and/or replaced with different steps, as will be recognized by a person of skill in the art with the aid of the present disclosure. The various steps of the method of FIG. 16, and variations thereof, will be further shown and described in connection with FIGS. 17 through 20, as follows.

Figure 17:
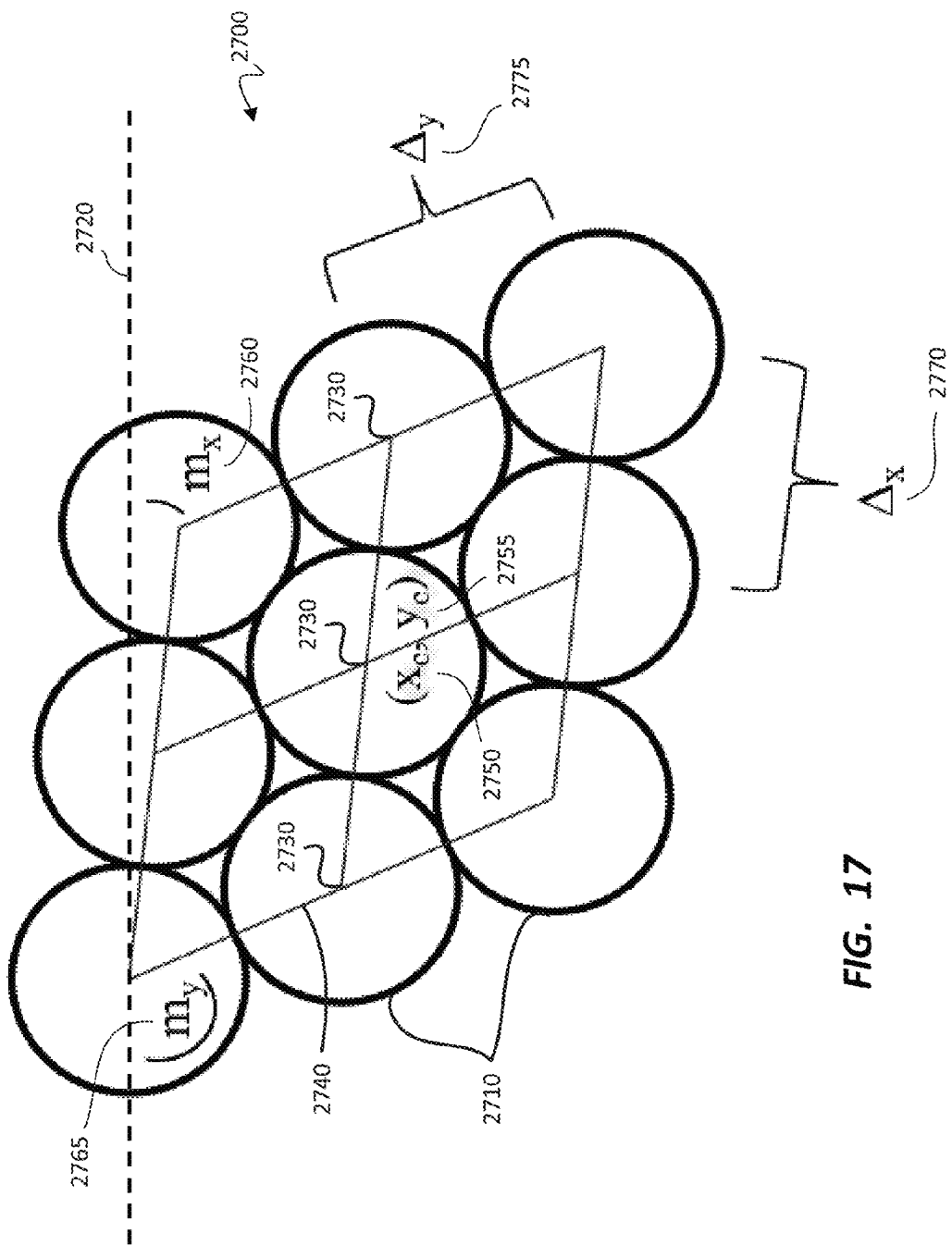
FIG. 17 is a diagram illustrating various parameters that may be used to define the preliminary model and/or the model generated in the method of FIG. 16.

FIG. 17 is a diagram 2700 illustrating various parameters that may be used to define the preliminary model generated in the step 2605 and/or the model generated in the step 2607 of FIG. 16. As shown in the diagram 2700, a plurality of microlenses 2710 are shown, relative to a horizontal plane 2720. Each of the microlenses 2710 may have a center 2730. The locations of the centers 2730 of the microlenses 2710 of the microlens array 802 may be modeled through the use of six parameters that define a sheared and rotated Cartesian grid 2740. The six parameters may be as follows:

The X coordinate 2750 ($x_c$) of a center 2730 of one of the microlenses 2710;

The Y coordinate 2755 ($y_c$) of the center 2730 for which the X coordinate 2750 is known;

The X slope 2760 ($m_x$) of the X-axis of the sheared and rotated Cartesian grid 2740;

The Y slope 2765 ($m_y$) of the Y-axis of the sheared and rotated Cartesian grid 2740;

The X spacing ($\Delta_x$) between adjacent microlenses 2710 along the X-axis of the sheared and rotated Cartesian grid 2740; and The Y spacing ($\Delta_y$) between adjacent microlenses 2710 along the Y-axis of the sheared and rotated Cartesian grid 2740.

Notably, FIG. 17 represents only one example of an arrangement of microlenses according to the present disclosure. According to various alternative embodiments (not shown), non-hexagonal microlens arrangements may be used. For example, microlenses may be arranged in a square sampling pattern, in which the microlenses are arranged along perpendicular (for example, horizontal and vertical) axes. Such a microlens arrangement may be modeled as a non-sheared rotated Cartesian grid, which may be considered a special case of the sheared rotated Cartesian grid described above, in which the shear is zero. In other examples, other, more complicated microlens arrangements may be used. Such microlens arrangements may or may not have patterns that are amenable to Cartesian representation. Accordingly, different models for such microlens arrangements may be constructed and iteratively modified in a manner similar to that of the model of FIG. 17.

FIG. 17 may be viewed as a crop of a calibration light-field image, an eroded calibration light-field image, or an inverted, eroded light-field image. Alternatively, FIG. 17 may be viewed as a section of the microlens array 802 itself. For calibration purposes, determining the location of a microlens 2710 may be done by determining the location of the corresponding microlens portion 2210. Accordingly, with reference to the various analytical steps described herein, microlens portion 2210 and microlens 2710 may be used interchangeably.

An initial guess may be provided (for example, as part of the step 2605 in which the preliminary model is generated) by finding the center of a microlens 2710 near the center of the calibration light-field image. This may be done simply by using a matched filter around a center subregion of the calibration light-field image. The location of the filtered peak may be used as (Xc, Yc), while the other parameters may be guessed from the manufacturing specifications. This initial guess may be iteratively updated by finding more centers 2730 further out from the center and correcting the preliminary model with the new center locations. Each iteration may use the previous iteration's model to find additional centers 2730, and then update the preliminary model with the center location.

The preliminary model may be stored as linear least squares fits of lines that run along either the X grid or the Y grid through the centers 2730 of the microlenses 2710. When a new center 2730 is found, its (X, Y) location may be used to update the fit of all the lines that intersect it. To prevent errors from photosensor problems (e.g. stuck pixels), the entire region around the center location may be used to update the preliminary model, with the weights of each (X, Y) location determined by a nonlinear function of its brightness. This process and the weighting function may be carried out as indicated previously in this specification.

Due to the uneven brightness in the microlenses 2710, this method may lead to biases in the preliminary model. To compensate for this, the interstitial shadows (i.e., interstitial spaces) at the corners of the microlenses 2710 may be used to provide the weighting function, which is immune to brightness variations within each disk. This may result in the generation of the model as in the step 2607 of FIG. 16.

Figures 18A, 18B, 18C:
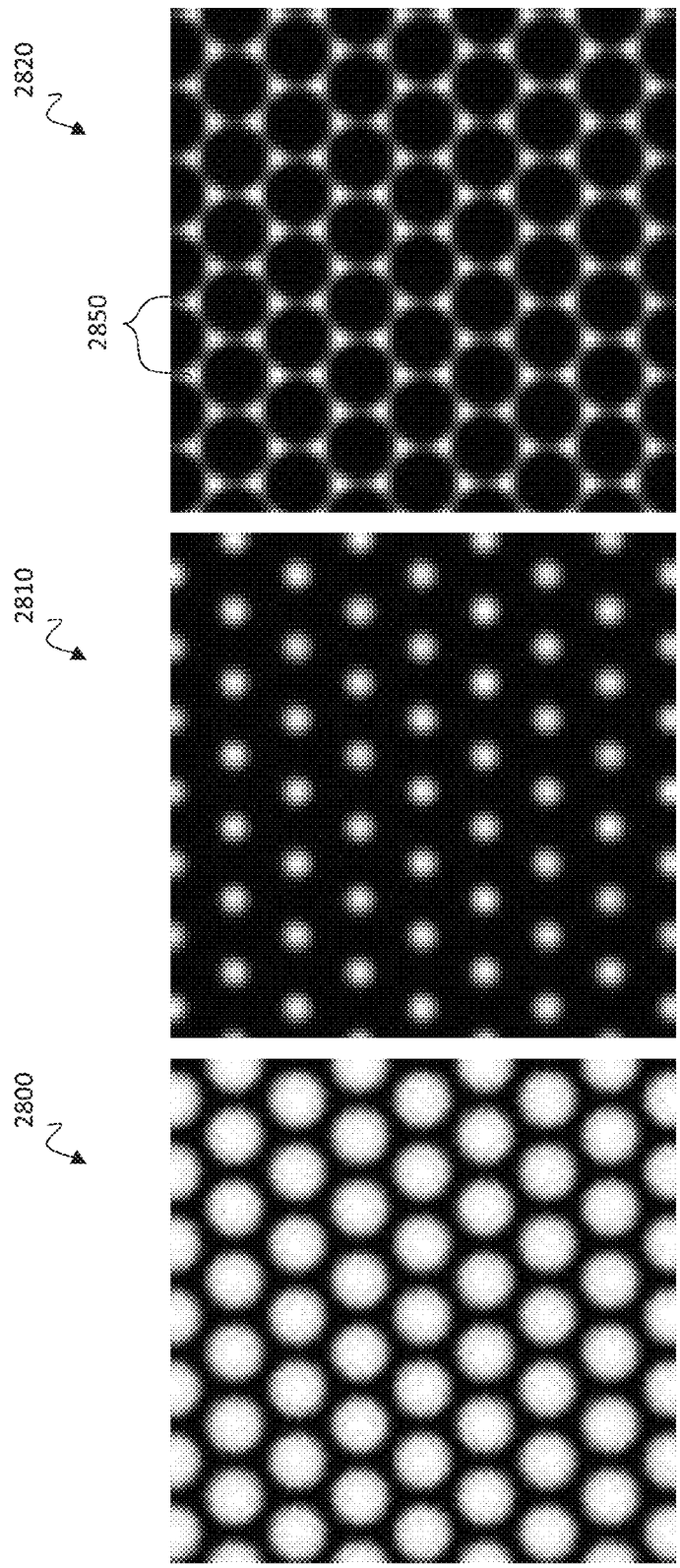
FIGS. 18A, 18B, and 18C illustrate images that are crops illustrating various steps in the generation of an inverted and eroded calibration light-field image, according to one embodiment.

Before identification of the interstitial spaces, an inverted and eroded light-field image may be generated, as in the step 2606 of FIG. 16. The calibration light-field image may first be inverted so that the interstitial shadows are bright. The local dynamic range may then be normalized across the image to compensate for the fact that interstitial spaces away from the center of the inverted calibration light-field image are more shaded than those close to the center, due to increased vignetting. This may be done by locally scaling the inverted calibration light-field image so that the local means better match the largest local mean. Finally the image may be eroded and scaled. FIGS. 18A, 18B, and 18C illustrate the results of this process.

FIGS. 18A, 18B, and 18C illustrate images 2800, 2810, and 2820, respectively, which are the 100-by-100 pixel crops illustrating various steps in the generation of an inverted and eroded calibration light-field image. FIG. 18A illustrates the original calibration light-field image (the image 2800), FIG. 18B illustrates the eroded and scaled calibration light-field image (the image 2810), and FIG. 18C illustrates the inverted, eroded, and scaled calibration light-field image (the image 2820). In some embodiments, an eroded calibration light-field image as in FIG. 18B may be used in performance of the step 2605, and an inverted and eroded calibration light-field image may be used in the performance of the step 2607.

The pixel intensities of the image 2810 and/or the image 2820 may be used as weights for the linear fits that represent the model (for example, the sheared and rotated Cartesian grid 2740). For example, the pixel intensity of the image 2820 may be used as a weighting value in the linear fit. However, prior to usage in the generation of the model, the coordinates obtained from the interstitial spaces may be offset to account for the location of the interstitial space relative to the center 2730 of the microlens 2710, as described in connection with FIG. 19.

Figure 19:
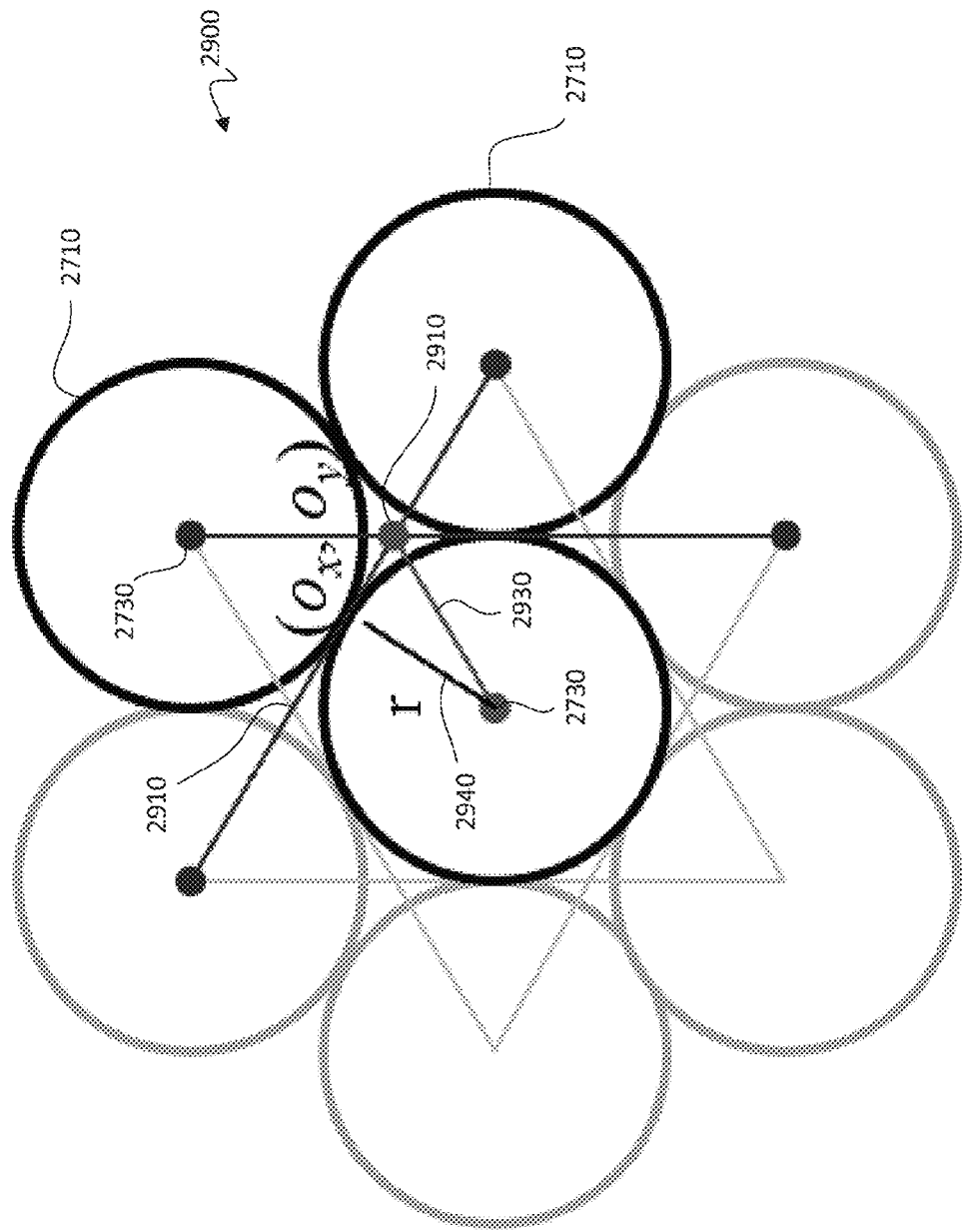
FIG. 19 is a diagram illustrating how the locations of the interstitial spaces between the microlenses may be used to locate the centers of the microlenses, according to one embodiment.

FIG. 19 is a diagram 2900 illustrating how the locations of the interstitial spaces between the microlenses 2710 may be used to locate the centers 2730 of the microlenses 2710. As shown, the distance between the center of an interstitial space and the center 2730 of one of the microlenses 2710 adjacent to it is indicated by a displacement 2930. The radius of a microlens 2710 is indicated by a radius 2940. The interstitial spaces may be located at the vertices of the hexagon that is tangent to all of the microlenses 2710 where they touch each other. The magnitude of the displacement 2930 may be obtained via the formula 2r/sqrt(3).

Using only a single interstitial space may result in large biases in the geometry estimation. Therefore, interstitial spaces on the opposite sides of a microlens 2710 may advantageously be used to more accurately obtain the location of the center 2730. In some embodiments, all six interstitial spaces around a microlens 2710 may be used. However, it may be sufficient to use only two interstitial spaces on opposite sides of the microlens 2710, such as the interstitial spaces at the top and bottom of the microlenses 2710. The weight of an (X, Y) location may be obtained via the following formula:

$$w(x,y) = \overline{I}^e(x+o_x, y+o_y) + \overline{I}^e(x-o_x, y-o_y)$$

Where $\overline{I}^e$ is the eroded inverse image. The symmetric weighting of an exemplary microlens will be shown in connection with FIG. 20.

Figure 20:
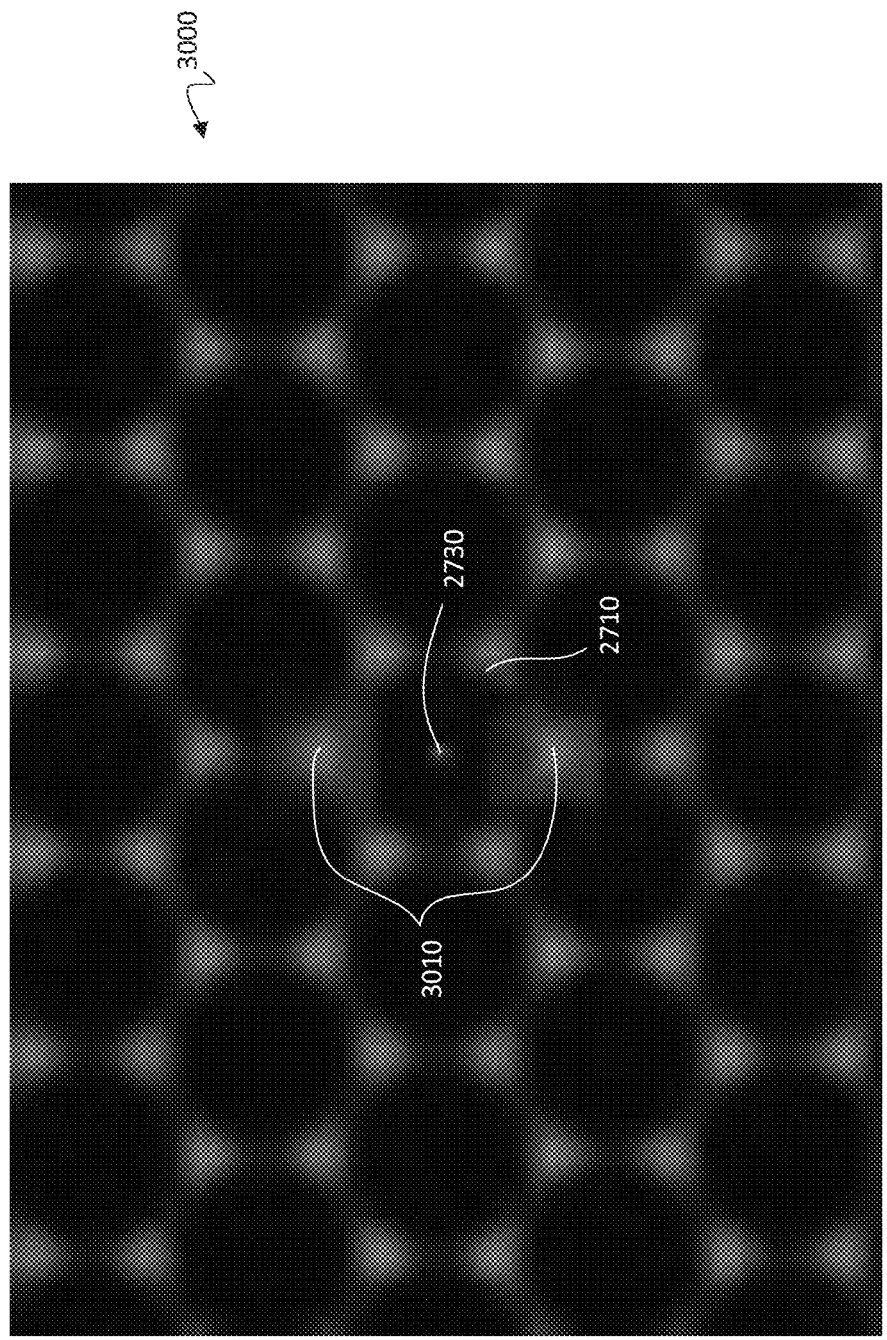
FIG. 20 is an image illustrating exemplary weighting using an inverse image, such as an inverse, eroded calibration light-field image illustrated in FIG. 18C, according to one embodiment.

FIG. 20 is an image 3000 illustrating exemplary weighting using an inverse image, such as an inverse, eroded calibration light-field image illustrated in FIG. 18C. The image 3000 illustrates the use of two interstitial spaces 3010 on opposite sides of a microlens 2710 to obtain the location of the center 2730 of the microlens 2710. The pixels around the interstitial spaces 3010 may be pixels that are used to weight the prediction of the location of the center 2730 as the model (for example, the sheared and rotated Cartesian grid 2740 of FIG. 17) is updated. The (X, Y) locations of the pixels in the highlighted regions may be offset so that they match the actual location of the center 2730.

Usage of the interstitial spaces may be more sensitive to errors in the initial stages of modeling refinement than other methods, such as direct identification of centers 2730. Thus, in at least one embodiment, an algorithm that does not use the interstitial spaces, which may use an eroded (but not inverted) calibration image such as the image 2810 of FIG. 18B, may be used for the first few iterations before switching to analysis of the interstitial spaces. This is represented in the method of FIG. 16 by the step 2605, in which the preliminary model is generated independently of the inverted, eroded calibration light-field image generated in the step 2606.

The global microlens position determination algorithm may be summarized as follows:

| Global Microlens Position Determination Algorithm |
| --- |
| Input: white light field disk image I, MLA Specifications P |
| Output: geometry model M |
| Parameters: Iteration count Ti, |
|             Iteration spacing Si, |
|             Iteration start for dark corner fitting Td, |
| 1    M = ComputeInitialDiskModel(I, P) |
| 2    I_w = CreateErodedWeightImage(I) |
| 3    I_i = CreateErodedInverseImage(I) |
| 4    For iter++ < Ti: |
| 5      centers = M.PredictNextDiskCenterLocations(iter, Si) |
| 6      For c in centers: |
| 7        For (x, y) near c: |
| 8          if iteration < Td |
| 9            w = I_w(x, y) |
| 10         else |
| 11           (ox, oy) = ComputeDarkCornerOffset(M) |
| 12           w = I_i(x + ox, y + oy) + I_i(x − ox, y − oy) |
| 13        M.AggregateLineFit(c, x, y, w) |
| 14   M.UpdateDiskModel( ) |

This algorithm may function as follows. Line 1 may estimate the initial model M by finding the center microlens 2710 (i.e., the center microlens portion 2210) of an image I and using the microlens array specifications P. Lines 2 and 3 may create the eroded calibration light-field image and the inverse, eroded calibration light-field image, respectively, for use in generating new models. The algorithm may then iterate through Ti iterations in line 4. In Line 5, the predicted locations of the centers 2730 of the microlenses 2710 may be obtained for this iteration. The algorithm may then search from the center of the image to the edge of the image, with each iteration searching for microlenses 2710 further away from the center. The spacing of each iteration may be controlled by Si, which is dependent on Ti. Ti and Si may be tuned to cover as much of the image as possible.

Line 6 may iterate over all of the predicted centers and line 7 may iterate over all pixel locations near those centers. For the first few iterations, in line 8, the eroded calibration lightfield image may be used for weighting, in line 9. This may be comparable to generation of the preliminary model in the step 2605 of the method of FIG. 16. Afterwards, in line 10, the inverse eroded calibration light-field image may be used as in line 12. When the inverse, eroded calibration light-field image is used for weighting the appropriate interstitial space, offsets may be taken into account as in line 11, which can be computed from the model. Line 13 may accumulate the X, Y, W data into the linear least square fit of the grid lines that run through that disk center c. After all (X, Y) locations are aggregated into the least squares fits, line 14 may solve for the linear fits again and may use the newly-obtained grid lines to update the model, as in repeated performance of the step 2607 of the method of FIG. 16. The updated model may then be used to predict the centers 2730 of the microlenses 2710 of the next iteration, which may commence with line 5.

Local Arc Fitting

For microlens portions 2210 affected by eclipse effects and/or the like, an enhanced local calibration may be used for the microlenses 2710 affected by the effect to more accurately locate the centers 2730 of the microlenses 2710. One manner in which this may be carried out will be shown and described in connection with FIGS. 21 through 26.

Figure 21:
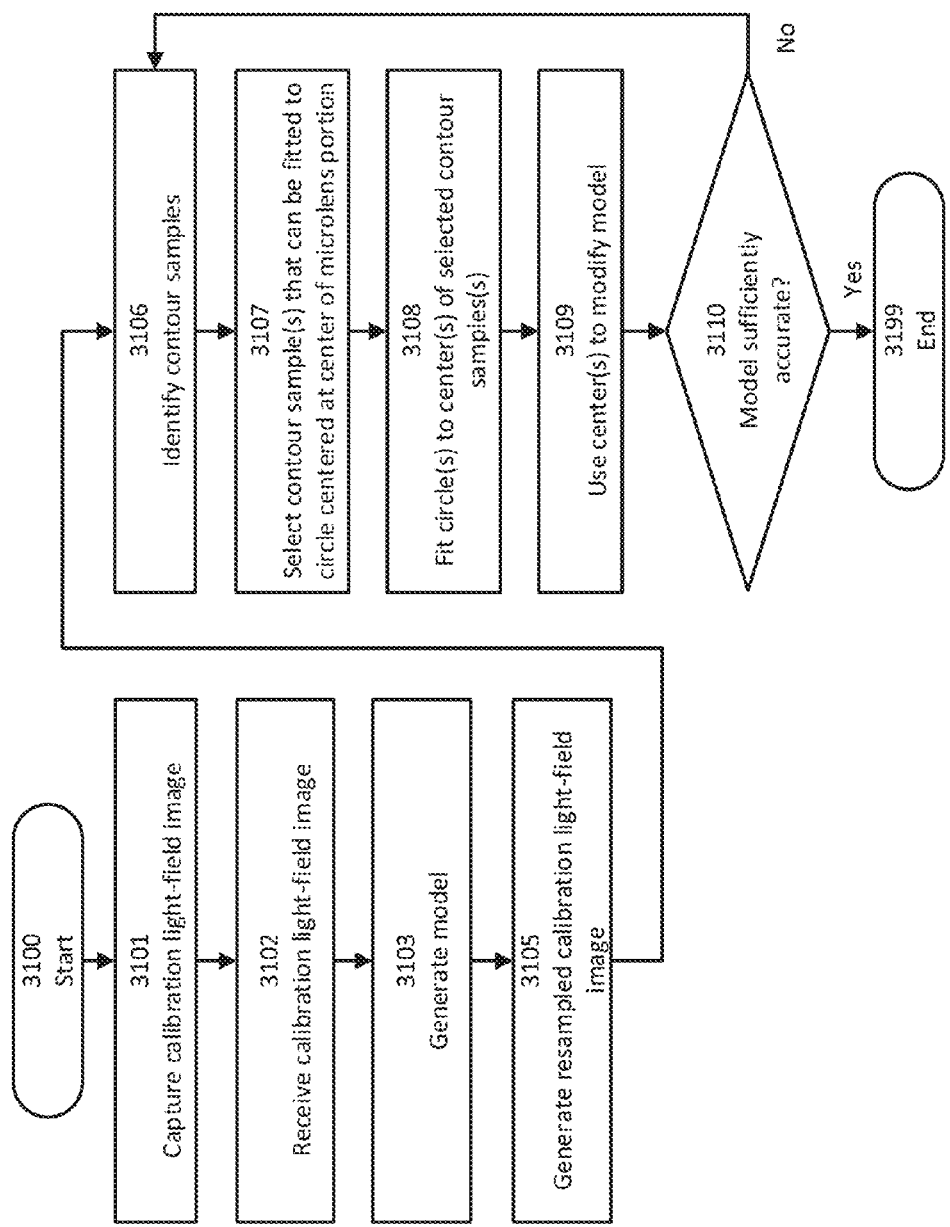
FIG. 21 is a flowchart diagram illustrating a method of developing a model indicative of the positions and/or orientations of the microlenses of a microlens array of a light-field image capture device, such as the camera of FIGS. 6A and/or 6B.
Figure 22:
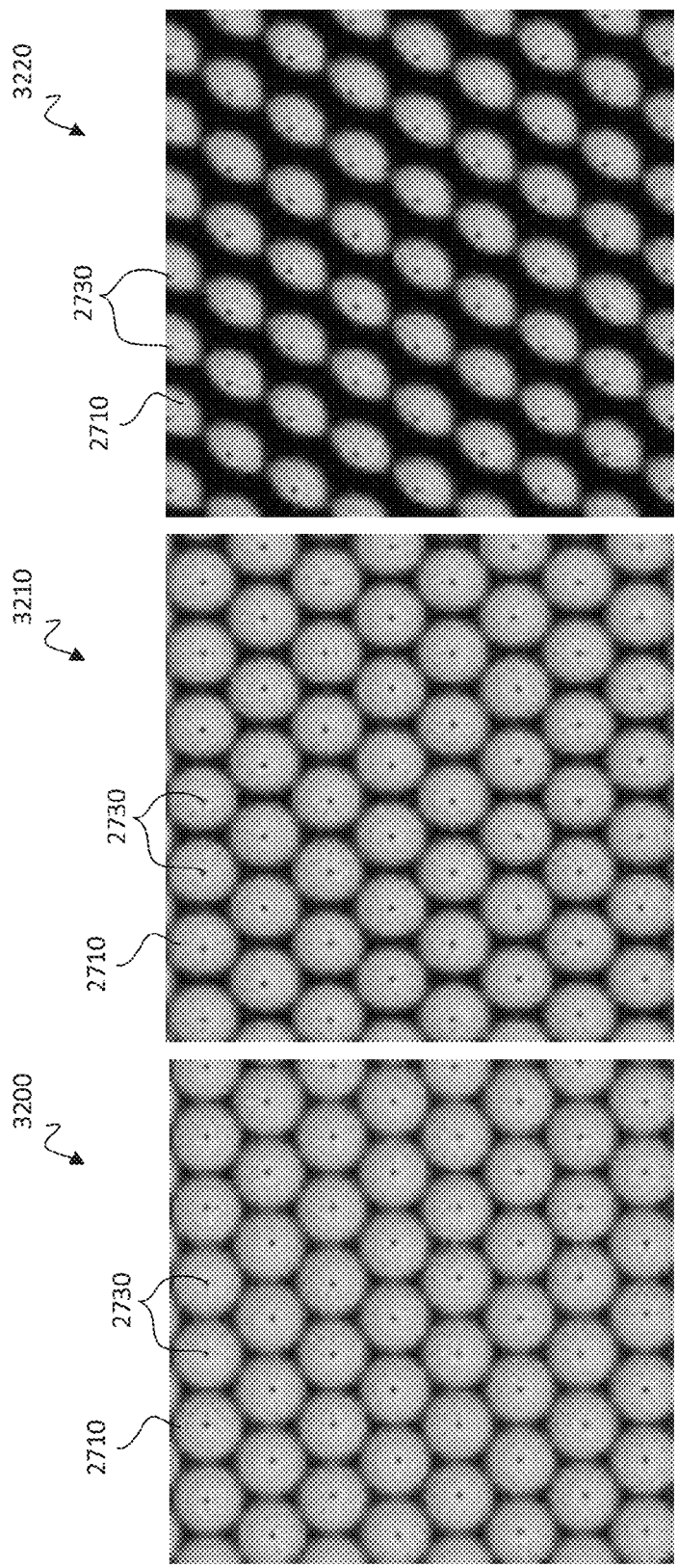
FIGS. 22A through 22C illustrate images that are crops analogous to the images of FIGS. 12, 13, and 14, respectively, according to one embodiment.

FIG. 21 is a flowchart diagram illustrating a method of developing a model indicative of the positions and/or orientations of the microlenses of a microlens array of a light-field image capture device, such as the camera 800 of FIGS. 6A and/or 6B. The method of FIG. 21 is optional; the method of FIG. 16 (or an alternative) may be performed without using the method of FIG. 21. If desired, the method of FIG. 21 may be used only for cameras in which eclipse effects or the like are observed to pose a problem for proper calibration. The method of FIG. 21 may be performed before, during, or after performance of the method of FIG. 16. Alternatively, the method of FIG. 21 may be used independently of that of FIG. 16, and may be employed in conjunction with calibration routines in which the interstitial spaces between microlens portions are not used to indicate microlens center locations.

Like the method of FIG. 16, the method of FIG. 21 may be performed, for example, with circuitry such as the post-processing circuitry 804 of the camera 800 of FIG. 6A or the post-processing circuitry 804 of the post-processing system 850 of FIG. 6B, which is independent of the camera 800. In some embodiments, a computing device may carry out the method; such a computing device may include one or more of desktop computers, laptop computers, smartphones, tablets, cameras, and/or other devices that process digital information. The following description will reference the camera 800 of FIGS. 6A and 6B; however, those of skill in the art will recognize that the method of FIG. 21 may also be used with cameras having different configurations from the exemplary configuration of the camera 800 disclosed herein.

The method may start 3100 with a step 3101 in which the calibration light-field image is captured, for example, by the sensor 803 of the camera 800. In a step 3102, the image may be received in a computing device, which may be the camera 800 as in FIG. 6A. Alternatively, the computing device may be separate from the camera 800 as in the post-processing system 850 of FIG. 6B, and may be any type of computing device, including but not limited to desktop computers, laptop computers, smartphones, tablets, and the like.

In the alternative to capturing and receiving the calibration light-field image with and/or from the camera 800, the method of FIG. 21 may involve receipt of the calibration light-field image from a data store to which the calibration light-field image was stored by a previous process. Such methods may include, but are not limited to, the method of FIG. 16.

In a step 3103, the calibration light-field image (and/or an eroded or other image derived from the calibration light-field image) may be used to generate a model indicative of the positions of the microlenses of the microlens array 802 of the camera 800, relative to the image sensor 203 of the camera 800. This may be done by directly identifying the centers of the microlens portions 2210 of the eroded calibration light-field image (for example, as the highest intensity locations in each of the microlens portions 2210, as indicated previously). Additionally or alternatively, any known calibration method may be used to generate the model, which may be modified and/or refined in subsequent steps.

In a step 3105, a resampled calibration light-field image may be generated. The resampled calibration light-field image may have higher angular resolution and/or lower spatial resolution than the calibration light-field image. Thus, the resampled calibration light-field image may provide more accurate determination of the centers 2730 of the microlenses 2710.

In a step 3106, a plurality of contour samples of one or more of the microlenses 2710 of the resampled calibration light-field image may be identified. The contour samples may be pixels that may represent edges of the microlens portions 2210. In a step 3107, one or more contour samples of the plurality of contour samples may be selected. Selection of the one or more contour samples may be based on a likelihood that each of the selected contour samples can be fitted to a circle centered at the center of the corresponding microlens portion 2210.

In a step 3108, circles may be fitted to the selected contour samples to locate the centers 2730 of the microlenses 2710 (i.e., the microlens portions 2210) to which they pertain. In a step 3109, the locations of the centers 2730 may be used to modify the model generated in the step 3103. The resulting modified model may be more accurately indicative of the positions of the microlenses than the previous iteration of the model.

After the model has been modified, in a query 3110, a determination may be made as to whether the model is sufficiently accurate. If so, the method may end 3199. However, if greater accuracy is needed, the method may return to the step 3106, and further analysis of the resampled calibration light-field image may be undertaken to generate a new model with greater accuracy. The previously generated model may be used in performance of the step 3106, the step 3107, and/or the step 3108 to provide for greater accuracy with each iteration.

The step 3109 may iterate until one or more criteria are met. Such criteria may relate to the number of iterations of the step 3109 that have been carried out, the magnitude of the change between iterations of the model, and/or the like. Additionally or alternatively, such criteria may include satisfaction of a test, such as the generation and automated or human assessment of a light-field image obtained with the camera 800 with the model used to provide calibration settings. Such criteria may be used to conduct the query 3110.

In alternative embodiments, the various steps of the method of FIG. 21 may be reordered, omitted, supplemented, and/or replaced with different steps, as will be recognized by a person of skill in the art with the aid of the present disclosure. The various steps of the method of FIG. 21, and variations thereof, will be further shown and described in connection with FIGS. 22 through 25.

While the brightness of a microlens portion 2210 may be affected by vignetting, its contour may still represent the shape of the aperture of the camera 800 (i.e., the aperture 812 of FIG. 7). Therefore, if the contour forms a perfect circle, its center would represent the center 2730 of the microlens 2710 that is to be obtained. Even when the disk appearance is strongly affected by ray blocking, as in FIG. 15, given the typical arrangement of the optical elements, the method of FIG. 21 may still be able to determine exactly which points on the contours come from the true aperture and are reliable. Therefore, contour samples may be reliably selected for the model fitting. In practice, due to the presence of noise, it may always be desirable to reject some contour samples. The contour of any given microlens portion 2210 may not be completed.

Therefore, this technique may be referred to as robust arc fitting. The results of robust arc fitting are shown in FIGS. 22A through 22C. The fitting quality is much better than in FIGS. 15A through 15C.

Specifically, FIGS. 22A through 22C illustrate images 3200, 3210, and 3220, respectively, which are the 100-by-100 pixel crops analogous to the images 2500, 2510, and 2520 of FIGS. 12, 13, and 14, respectively. Robust arc fitting has been used to obtain locations of the centers 2730 of the microlenses 2710. As shown, the centers 2730 appear very close to the centers of the circles that represent the microlenses 2710, even when the microlenses 2710 are partially occluded as in FIG. 22C.

The resampled calibration light-field image of the step 3105 may be generated according to various methods. One exemplary algorithm for generating the resampled calibration light-field image will be shown and described below:

| Computation of Resampled Calibration Light-Field Image Algorithm |
| --- |
| Compute4DTable(I, M) |
| Input: light field image I, calibration model M |
| Output: 4D table T |
| Parameter: Spatial resample rate Ks and angular resample rate Ka |
| 1    For each sensor sample p in I: |
| 2        Compute the 4D coordinate (x,y,u,v) for p |
| 3        (x',y',u',v') = (x*Ks, y*Ky, u*Ka, v*Ka) |
| 4        Splat I(p) to T(x',y',u',v') |
| 5    Normalize T |

In this algorithm, the calibration light-field image may be sampled into a new one with lower spatial but higher angular resolutions. The resampled calibration light-field image may be referred to as a four-dimensional, or "4D," table. Usage of the resampled calibration light-field image may be advantageous because it may enable accurate identification of the contour of each microlens 2710; however, it may not be necessary to perform the arc fitting on all disks as the correction function is likely to be spatially smooth. Accordingly, only a portion of the calibration light-field image need be represented in the resampled calibration light-field image.

Any resampling technique for general signal processing can be applied in the generation of the resampled calibration light-field image. One implementation is shown in the algorithm provided above. For each pixel of the calibration light-field image, the corresponding 4D coordinate may be calculated using the input calibration model. The 4D coordinate may be rescaled by the resampling rate (Ks and Ka), and then splatted to the 4D table, as shown in FIG. 23.

Figure 23:
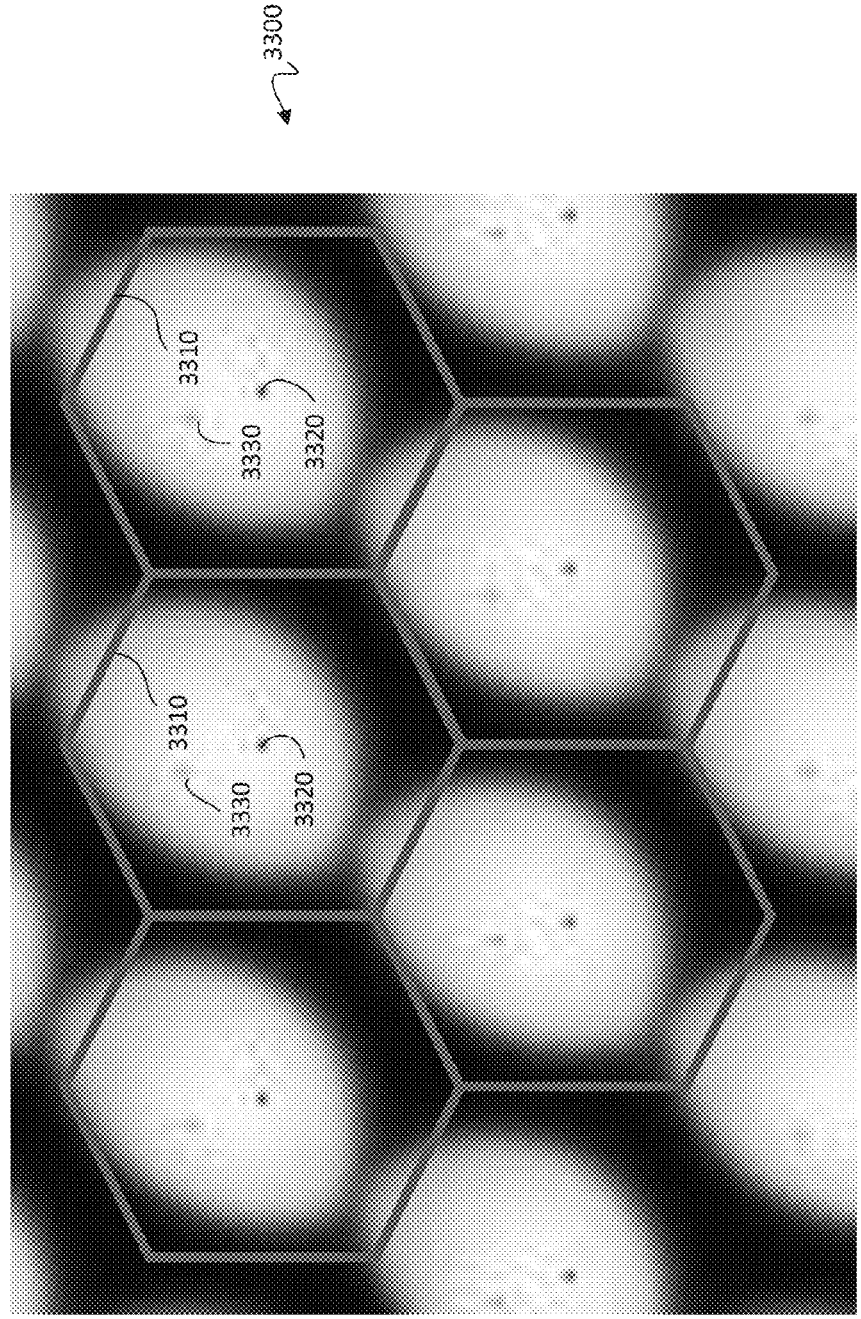
FIG. 23 is an image showing a crop of a resampled 4D table, according to one embodiment.

FIG. 23 is an image 3300 showing a crop of a resampled 4D table. By comparison with the calibration light-field image, the 4D table may have double the radius for each of the microlens portions 2210, but the total number of microlens portions 2210 may be reduced by a factor of twenty.

The hexagonal shapes 3310 show the boundaries between the disks defined by a calibration model that does not utilize arc fitting or any other method to correct for eclipse effects or the like. The boundaries are clearly wrong, and cover significant portions of neighboring microlens portions 2210. The corresponding centers 3320 are also incorrect. Arc fitting may be used to obtain the locations of the correct centers 3330. This may entail performance of the steps 3106, 3107, 3108, and 3109 of the method of FIG. 21. These steps will be represented in pseudocode as follows.

| Robust Arc Fitting Algorithm |
| --- |
| RobustArcFitting(I, M) |
| Input: light field image I, current calibration model M |
| Output: correction function F |
| Parameters:   windows size N, |
|                  gradient threshold Tg, |
|                  directional threshold Td |
| 1    T = Compute4DTable(I, M) |
| 2    For each current disk center c in T: |
| 3        // let cx, cy be the coordinate of c |
| 4        Create window W of size N-by-N around c in T |
| 5        contourSet = { } |
| 6        For each pixel p in W: |
| 7            Compute the horizontal/vertical gradient G = (Gx, Gy) |
| 8            If |G| > Tg and (Gx*cx + Gy*cy) > Td: |
| 9                Add p to contourSet |
| 10      f = FitCircle(contourSet) |
| 11      add correction term [f.center.x − c.x, f.center.y − c.y] to F |

This algorithm may initially iterate for all of the microlens portions 2210 represented in the 4D table. For the center 2730 of each of the microlens portions 2210, an N-by-N window may be cropped from the 4D table. The window may be larger than the grid size (the hexagonal shapes 3310 of FIG. 23), since the model that generated the grid size may not be reliable. Next, a plurality of contour samples in each window may be identified. One or more contour samples from each window may be selected for use in arc fitting and/or circle fitting to locate the center of the corresponding microlens portion 2210.

Contour samples may be selected, for example, based on the following criteria:

The contour sample is on the edge of the disk and thus has strong intensity gradient.

The intensity of the contour sample is oriented toward the optical center, as the edge on the other side can be caused by the ray-blocking.

A determination may be made as to whether each pixel has these properties, via application of a simple threshold. One example will be shown and described in connection with FIGS. 24A, 24B, and 24C.

FIGS. 24A, 24B, and 24C illustrate images 3400, 3410, and 3420, respectively, which are the 100-by-100 pixel crops of a portion of the 4D table of FIG. 23, before contour sample selection (FIG. 24A), after identification of a plurality of contour samples (FIG. 24B), and after selection contour samples of the plurality of contour samples for arc fitting (FIG. 24C). FIG. 24A illustrates the presence of a true edge 3430 of the corresponding microlens 2710, and a false edge 3440 caused by an eclipse effect. FIG. 24B illustrates all identified contour samples 3450, and 24C illustrates only the contour samples 3460 of FIG. 24B that are deemed most reliable for arc fitting to locate the center 2730 of the microlens 2710.

In order to eliminate contour samples that are not suitable for arc fitting (such as the contour samples 3450 of FIG. 24B that correspond to the false edge 3440 of FIG. 24A, the samples from neighboring microlenses 2710, and any contour samples improperly identified due to imperfect threshold settings and noises), an optimization algorithm may be used. One exemplary algorithm will be set forth in pseudocode, as follows:

---

Circle Fitting Optimization Algorithm

---

```
FitCircle(S)
Input: potential samples on the circle S
Output: Circle c with center and radius parameters
Parameters: Iteration count Ti
            Inlier threshold Ei
1       SBest = { }, scoreBest = −1
2       iteration = 0
3       // RANSAC iteration
4       For iteration++ < Ti:
5           Randomly pick 3 samples from s into a set P
6           SCurr = { }
7           cCurr = Fit(p); // Use the algorithm in Umbach and Jones
8           scoreCurr = 0;
9           For sample p in S:
10              If |dist(cCurr.center, p) − cCurr.radius| < Ei:
11                  Add p to SCurr
12                  scoreCurr++
13          If scoreCurr > scoreBest:
14              SBest = SCurr, scoreBest = scoreCurr
15      // Final fitting
16      Return Fit(SBest)
```

In the foregoing algorithm, a RANSAC-style optimization may be applied to first identify all inliers (line 4 to 14 in the algorithm). Such an optimization may be as described at https://en.wikipedia.org/wiki/RANSAC. Specifically, random subsets may be used to create many proposals of the circle. The proposal to which the most samples agree may be selected. Finally, the samples that agree with the best proposal may be used to perform a final least-square-error estimation. Reference algorithms for proposal creation and the final estimation of a 2D circle from point samples can be found in "A few methods for fitting circles to data," by Dale Umbach and Kerry N. Jones, from IEEE Transactions on Instrumentation and Measurement, 2003 (referred to in the algorithm as "Umbach and Jones").

Finally, the distance between the estimated circle center (for example, the center 2730 shown in FIG. 24C) and the original center may be the amount of the correction to be applied to the model at that region. Correction terms for all microlens portions 2210 in the 4D table may be used to generate a correction function F, which may be applied during the light-field processing as demonstrated previously. Such correction functions may form an integral part of the model used for calibration.

Figure 25A:
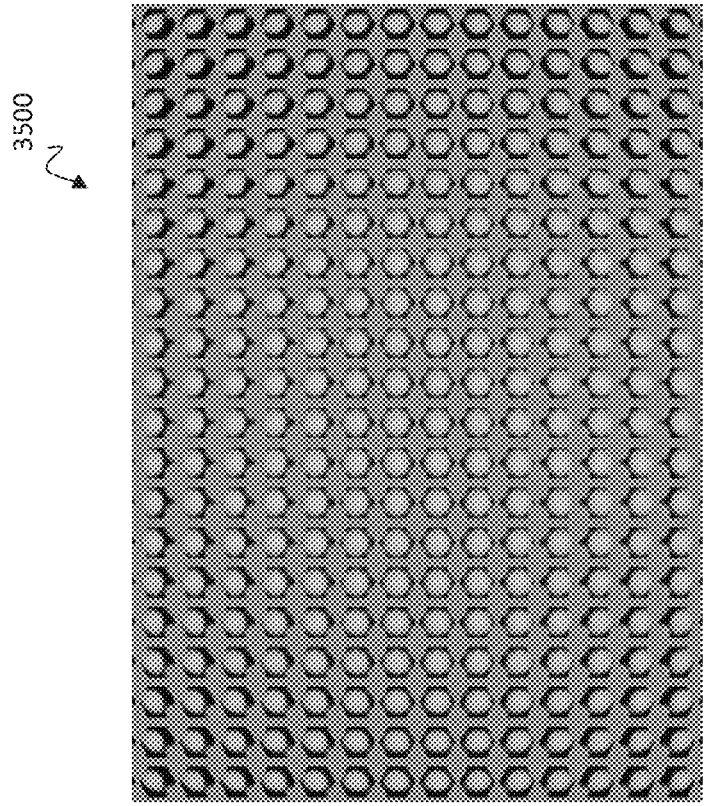
FIGS. 25A and 25B illustrate two 4D tables generated by the original model and the new model after correction, respectively, according to one embodiment.
Figure 25B:
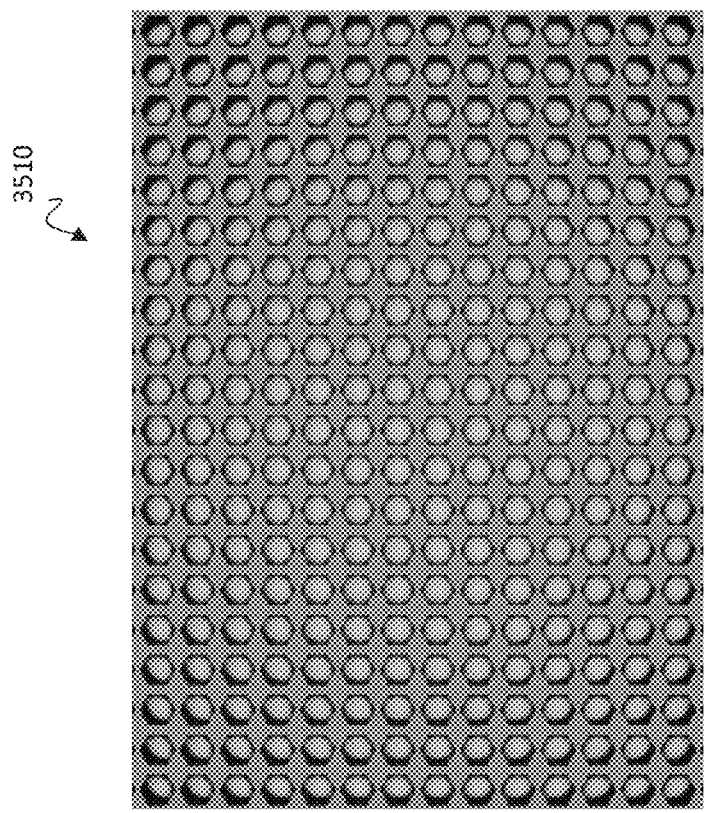

FIGS. 25A and 25B illustrate two 4D tables 3500 and 3510, generated by the original model and the new model after correction, respectively. For better visualization, the neighboring hexagonal regions have been separated and arranged into a regular grid. The calibration model with arc fitting (in FIG. 25B) is much more accurate than that of FIG. 25A (no arc fitting). This is the case because, in FIG. 25B, no microlens 2710 appears in its neighbors' area, and the contours of the aperture align well with the disk boundary defined by the model.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A method for calibrating microlens positions for a light-field image capture device having a plurality of microlenses, the method comprising:
   in a data store, receiving a calibration light-field image captured by the light-field image capture device, the calibration light-field image comprising a plurality of microlens portions, each of which comprises microlens light-field data received through a single microlens of the plurality of microlenses;
   in a processor, identifying a plurality of interstitial spaces between the microlens portions to obtain a plurality of interstitial space locations; and
   in the processor, using the interstitial space locations to generate a model that is indicative of the microlens positions, wherein the model can be applied in generating projected images from light-field data captured by the light-field image capture device.

2. The method of claim 1, further comprising, in the processor, inverting and eroding the calibration light-field image to generate an inverted and eroded light-field image in which the interstitial spaces have relatively high intensities;
   wherein identifying the plurality of interstitial spaces comprises analyzing the inverted and eroded light-field image.

3. The method of claim 1, wherein using the interstitial space locations to generate the model comprises using at least two of the interstitial space locations adjacent to a first microlens portion of the plurality of microlens portions to identify a first center location of a first center of the first microlens portion.

4. The method of claim 3, wherein the model comprises a sheared Cartesian grid defined by parameters comprising at least one of the microlens positions, a slope between individual microlenses of the plurality of microlenses, and a spacing between individual microlenses of the plurality of microlenses.

5. The method of claim 3, further comprising, after generation of the model:

in the processor, identifying a second center location of a second center of a second microlens portion of the plurality of microlens portions; and in the processor, using the first center location and the second center location to modify the model to generate a modified model that is more accurately indicative of the microlens positions than the model.

6. The method of claim 5, further comprising, after generation of the modified model:

in the processor, identifying a third center location of a third center of a third microlens portion of the plurality of microlens portions;

in the processor, identifying a fourth center location of a fourth center of a fourth microlens portion of the plurality of microlens portions; and in the processor, using the third center location and the fourth center location to modify the modified model to generate a further modified model that is more accurately indicative of the microlens positions than the modified model.

7. The method of claim 6, further comprising:

in the processor, eroding the calibration light-field image to generate an eroded light-field image;

in the processor, using the eroded light-field image to identify a fifth center location of a fifth center of a first microlens portion of the plurality of microlens portions;

in the processor, using the eroded light-field image to identify a sixth center location of a sixth center of a sixth microlens portion of the plurality of microlens portions;

in the processor, using the fifth center location and the sixth center location to generate a preliminary model that is indicative of the microlens positions; and in the processor, inverting and eroding the calibration light-field image to generate an inverted and eroded light-field image in which the interstitial spaces have relatively high intensities;

wherein identifying the plurality of interstitial spaces comprises analyzing the inverted and eroded light-field image;

wherein each of identifying the first center of the first microlens portion, identifying the second center of the second microlens portion, identifying the third center of the third microlens portion, and identifying the fourth center of the fourth microlens portion comprises using the inverted and eroded light-field image.

8. A method for calibrating microlens positions for a light-field image capture device having a plurality of microlenses, the method comprising:

in a data store, receiving a calibration light-field image captured by the light-field image capture device, the calibration light-field image comprising a plurality of microlens portions, each of which comprises microlens light-field data received through a single microlens of the plurality of microlenses;

in a processor, using the calibration light-field image to select a first contour sample of a first microlens portion of the plurality of microlens portions from among a plurality of contour samples;

in the processor, fitting the first contour sample to a circle centered at a first center location of the first microlens portion to identify the first center location; and in the processor, using the first center location to generate a model that is indicative of the microlens positions.

9. The method of claim 8, further comprising, in the processor, prior to using the calibration light-field image to select the first contour sample of the first microlens portion, generating a preliminary model that is indicative of the microlens positions, wherein the model is more accurately indicative of the microlens positions than the preliminary model.

10. The method of claim 9, wherein using the calibration light-field image to select the first contour sample comprises:

using the calibration light-field image to generate a resampled calibration light-field image with higher angular resolution than the light-field calibration image;

identifying the plurality of contour samples in the resampled calibration light-field image; and selecting the first contour sample from within the resampled calibration light-field image.

11. The method of claim 10, wherein using the calibration light-field image to select the first contour sample comprises applying the preliminary model to the resampled calibration light-field image to crop a window from the resampled calibration light-field image, wherein the window contains a majority of the first microlens portion.

12. The method of claim 8, wherein selecting the first contour sample comprises:

determining that the first contour sample has a strong intensity gradient; and determining that the first contour sample has an intensity oriented toward an optical center of the calibration light-field image.

13. The method of claim 8, wherein selecting the first contour sample comprises rejecting outliers of the plurality of contour samples, wherein the outliers are not readily fitted to the circle.

14. The method of claim 13, wherein rejecting the outliers comprises applying a RANSAC algorithm.

15. A non-transitory computer-readable medium for calibrating microlens positions for a light-field image capture device having a plurality of microlenses, comprising instructions stored thereon, that when executed by a processor, perform the steps of:

causing a data store to receive a calibration light-field image captured by the light-field image capture device, the calibration light-field image comprising a plurality of microlens portions, each of which comprises microlens light-field data received through a single microlens of the plurality of microlenses;

identifying a plurality of interstitial spaces between the microlens portions to obtain a plurality of interstitial space locations; and using the interstitial space locations to generate a model that is indicative of the microlens positions, wherein the model can be applied in generating projected images from light-field data captured by the light-field image capture device.

16. The non-transitory computer-readable medium of claim 15, further comprising instructions stored thereon, that when executed by a processor, invert and erode the calibration light-field image to generate an inverted and eroded light-field image in which the interstitial spaces have relatively high intensities;

wherein identifying the plurality of interstitial spaces comprises analyzing the inverted and eroded light-field image.

17. The non-transitory computer-readable medium of claim 15, wherein using the interstitial space locations to generate the model comprises using at least two of the interstitial space locations adjacent to a first microlens portion of the plurality of microlens portions to identify a first center location of a first center of the first microlens portion.

18. The non-transitory computer-readable medium of claim 17, wherein the model comprises a sheared Cartesian grid defined by parameters comprising at least one of the microlens positions, a slope between individual microlenses of the plurality of microlenses, and a spacing between individual microlenses of the plurality of microlenses.

19. The non-transitory computer-readable medium of claim 17, further comprising instructions stored thereon, that when executed by a processor, after generation of the model:
identify a second center location of a second center of a second microlens portion of the plurality of microlens portions; and
use the first center location and the second center location to modify the model to generate a modified model that is more accurately indicative of the microlens positions than the model.

20. A non-transitory computer-readable medium for calibrating microlens positions for a light-field image capture device having a plurality of microlenses, the non-transitory computer-readable medium comprising instructions stored thereon, that when executed by a processor, perform the steps of:
causing a data store to receive a calibration light-field image captured by the light-field image capture device, the calibration light-field image comprising a plurality of microlens portions, each of which comprises microlens light-field data received through a single microlens of the plurality of microlenses;
use the calibration light-field image to select a first contour sample of a first microlens portion of the plurality of microlens portions from among a plurality of contour samples;
fit the first contour sample to a circle centered at a first center location of the first microlens portion to identify the first center location; and
use the first center location to generate a model that is indicative of the microlens positions.

21. The non-transitory computer-readable medium of claim 20, further comprising instructions stored thereon, that when executed by a processor, prior to using the calibration light-field image to select the first contour sample of the first microlens portion, generate a preliminary model that is indicative of the microlens positions, wherein the model is more accurately indicative of the microlens positions than the preliminary model.

22. The non-transitory computer-readable medium of claim 21, wherein using the calibration light-field image to select the first contour sample comprises:
using the calibration light-field image to generate a resampled calibration light-field image with higher angular resolution than the light-field calibration image;
identifying the plurality of contour samples in the resampled calibration light-field image;
selecting the first contour sample from within the resampled calibration light-field image; and
applying the preliminary model to the resampled calibration light-field image to crop a window from the resampled calibration light-field image, wherein the window contains a majority of the first microlens portion.

23. The non-transitory computer-readable medium of claim 20, wherein selecting the first contour sample comprises:
determining that the first contour sample has a strong intensity gradient; and
determining that the first contour sample has an intensity oriented toward an optical center of the calibration light-field image.

24. The non-transitory computer-readable medium of claim 20, wherein selecting the first contour sample comprises rejecting outliers of the plurality of contour samples, wherein the outliers are not readily fitted to the circle by applying a RANSAC algorithm.

25. A system for calibrating microlens positions for a light-field image capture device having a plurality of microlenses, the system comprising:
a data store configured to receive a calibration light-field image captured by the light-field image capture device, the calibration light-field image comprising a plurality of microlens portions, each of which comprises microlens light-field data received through a single microlens of the plurality of microlenses; and
a processor, communicatively coupled to the data store, configured to:
identify a plurality of interstitial spaces between the microlens portions to obtain a plurality of interstitial space locations; and
use the interstitial space locations to generate a model that is indicative of the microlens positions, wherein the model can be applied in generating projected images from light-field data captured by the light-field image capture device.

26. The system of claim 25, wherein the processor is further configured to invert and erode the calibration light-field image to generate an inverted and eroded light-field image in which the interstitial spaces have relatively high intensities;
wherein the processor is configured to identify the plurality of interstitial spaces by analyzing the inverted and eroded light-field image.

27. The system of claim 25, wherein the processor is configured to use the interstitial space locations to generate the model by using at least two of the interstitial space locations adjacent to a first microlens portion of the plurality of microlens portions to identify a first center location of a first center of the first microlens portion.

28. The system of claim 27, wherein the model comprises a sheared Cartesian grid defined by parameters comprising at least one of the microlens positions, a slope between individual microlenses of the plurality of microlenses, and a spacing between individual microlenses of the plurality of microlenses.

29. The system of claim 27, wherein the processor is further configured, after generation of the model, to:
identify a second center location of a second center of a second microlens portion of the plurality of microlens portions; and
use the first center location and the second center location to modify the model to generate a modified model that is more accurately indicative of the microlens positions than the model.

30. A system for calibrating microlens positions for a light-field image capture device having a plurality of microlenses, the system comprising:
a data store configured to receive a calibration light-field image captured by the light-field image capture device, the calibration light-field image comprising a plurality of microlens portions, each of which comprises microlens light-field data received through a single microlens of the plurality of microlenses; and
a processor, communicatively coupled to the data store, configured to:
use the calibration light-field image to select a first contour sample of a first microlens portion of the plurality of microlens portions from among a plurality of contour samples;
fit the first contour sample to a circle centered at a first center location of the first microlens portion to identify the first center location; and use the first center location to generate a model that is indicative of the microlens positions.

31. The system of claim 30, wherein the processor is further configured, prior to using the calibration light-field image to select the first contour sample of the first microlens portion, to generate a preliminary model that is indicative of the microlens positions;

wherein the model is more accurately indicative of the microlens positions than the preliminary model.

32. The system of claim 31, wherein the processor is configured to use the calibration light-field image to select the first contour sample by:

using the calibration light-field image to generate a resampled calibration light-field image with higher angular resolution than the light-field calibration image;

identifying the plurality of contour samples in the resampled calibration light-field image;

selecting the first contour sample from within the resampled calibration light-field image; and applying the preliminary model to the resampled calibration light-field image to crop a window from the resampled calibration light-field image, wherein the window contains a majority of the first microlens portion.

33. The system of claim 30, wherein the processor is configured to select the first contour sample by:

determining that the first contour sample has a strong intensity gradient; and determining that the first contour sample has an intensity oriented toward an optical center of the calibration light-field image.

34. The system of claim 30, wherein the processor is configured to select the first contour sample by rejecting outliers of the plurality of contour samples by applying a RANSAC algorithm, wherein the outliers are not readily fitted to the circle.

* * * * *